(12) United States Patent
Höglund et al.

(10) Patent No.: US 12,426,098 B2
(45) Date of Patent: Sep. 23, 2025

(54) WIRELESS DEVICE, NETWORK NODE, AND METHODS PERFORMED THEREBY, FOR HANDLING UPLINK COMMUNICATION

(71) Applicant: Telefonaktiebolaget LM Ericsson (publ), Stockholm (SE)

(72) Inventors: Andreas Höglund, Solna (SE); Olof Liberg, Enskede (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 343 days.

(21) Appl. No.: 18/010,897

(22) PCT Filed: Jul. 1, 2021

(86) PCT No.: PCT/SE2021/050664
§ 371 (c)(1),
(2) Date: Dec. 16, 2022

(87) PCT Pub. No.: WO2022/005385
PCT Pub. Date: Jan. 6, 2022

(65) Prior Publication Data
US 2023/0300901 A1    Sep. 21, 2023

Related U.S. Application Data

(60) Provisional application No. 63/046,769, filed on Jul. 1, 2020.

(51) Int. Cl.
*H04W 74/0833*    (2024.01)
*H04L 1/1812*    (2023.01)
(Continued)

(52) U.S. Cl.
CPC ....... *H04W 74/0841* (2013.01); *H04L 1/1812* (2013.01); *H04W 56/0045* (2013.01); *H04W 72/1268* (2013.01)

(58) Field of Classification Search
CPC ......... H04W 74/0841; H04W 56/0045; H04W 72/1268; H04W 74/0836; H04W 74/006; H04W 74/0833; H04L 1/1812
See application file for complete search history.

(56) References Cited

U.S. PATENT DOCUMENTS

| | | | |
|---|---|---|---|
| 2018/0034515 A1* | 2/2018 | Guo | H04B 7/0404 |
| 2018/0092073 A1* | 3/2018 | Nogami | H04W 52/16 |
| 2020/0260485 A1* | 8/2020 | Lei | H04W 72/23 |
| 2021/0345424 A1* | 11/2021 | Cirik | H04W 74/02 |

FOREIGN PATENT DOCUMENTS

| | | | |
|---|---|---|---|
| WO | 2020033895 A1 | 2/2020 | |
| WO | 2020065619 A1 | 4/2020 | |
| WO | WO-2021064709 A1 * | 4/2021 | ........... H04L 1/0061 |

OTHER PUBLICATIONS

3GPP, "3GPP TR 22.891 V14.2.0", 3rd Generation Partnership Project; Technical Specification Group Services and System Aspects; Feasibility Study on New Services and Markets Technology Enablers; Stage 1 (Release 14), Sep. 2016, 1-95.

(Continued)

*Primary Examiner* — Afshawn M Towfighi
(74) *Attorney, Agent, or Firm* — Murphy, Bilak & Homiller, PLLC

(57) ABSTRACT

A wireless device (130) obtains (601) a configuration of a set of periodic uplink resources specific for the device. The configuration configures the set of resources to support: a) a first procedure comprising a first Physical Uplink Shared Channel (PUSCH) transmission of a Message A (MsgA) transmission, b) a second procedure comprising uplink transmissions of, or corresponding to, a two-step Random Access Channel (RACH) procedure comprising, a first Physical Random Access Channel (PRACH) transmission and a second PUSCH transmission, and/or c) a third procedure comprising uplink transmissions of, or corresponding to, a four-step RACH procedure comprising a second (Continued)

PRACH transmission, and a third PUSCH transmission. A Timing Advance (TA) value of at least one of the transmissions is: i) independently configurable between the PUSCH and the PRACH transmissions, ii) configured to be zero, and the wireless device (130) refrains from validating the TA value, and/or iii) explicitly configured and validated before transmission from inactive or idle.

26 Claims, 13 Drawing Sheets

(51) Int. Cl.
*H04W 56/00* (2009.01)
*H04W 72/1268* (2023.01)

(56) References Cited

OTHER PUBLICATIONS

3GPP, "3GPP TS 38.213 V16.1.0", 3rd Generation Partnership Project; Technical Specification Group Radio Access Network; NR; Physical layer procedures for control (Release 16), Mar. 2020, 1-156.
Samsung, "Discussion on transmission in preconfigured UL resources for NB-IOT", 3GPP TSG RAN WG1 Meeting #95, R1-1812947, Spokane, USA, Nov. 12-16, 2018, 1-6.
ZTE Corporation, "Summary of small data enhancements for NR Rel-17", 3GPP TSG-RAN Meeting #85, RP-191840, Newport Beach, USA, Sep. 16-20, 2019, 1-51.
ZTE Corporation, "Work Item on NR small data transmissions in Inactive state", 3GPP TSG RAN Meeting #86, RP-193252, Sitges, Spain, Dec. 9-12, 2019, 1-4.

* cited by examiner a)

b)

a)

b)

a)

b)

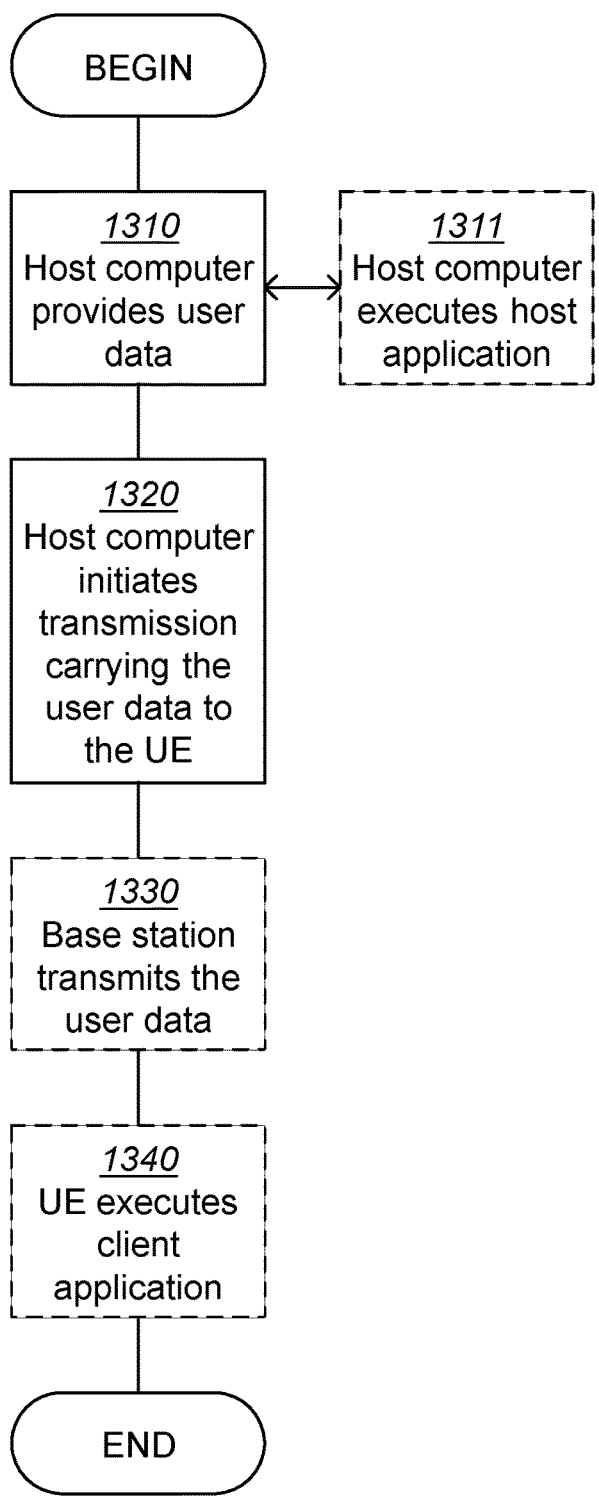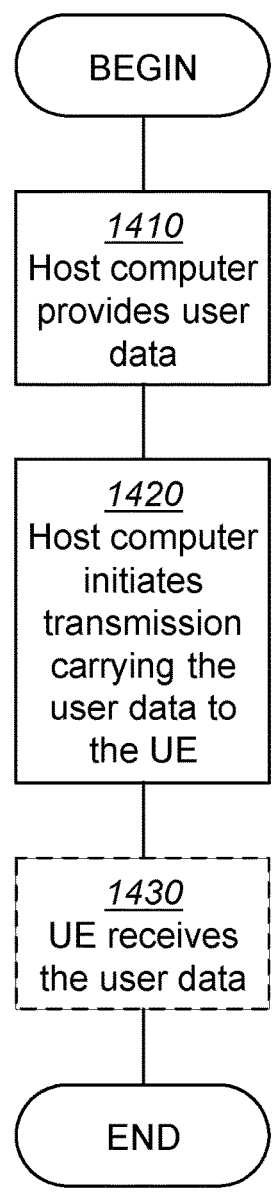
FIG. 13
FIG. 14

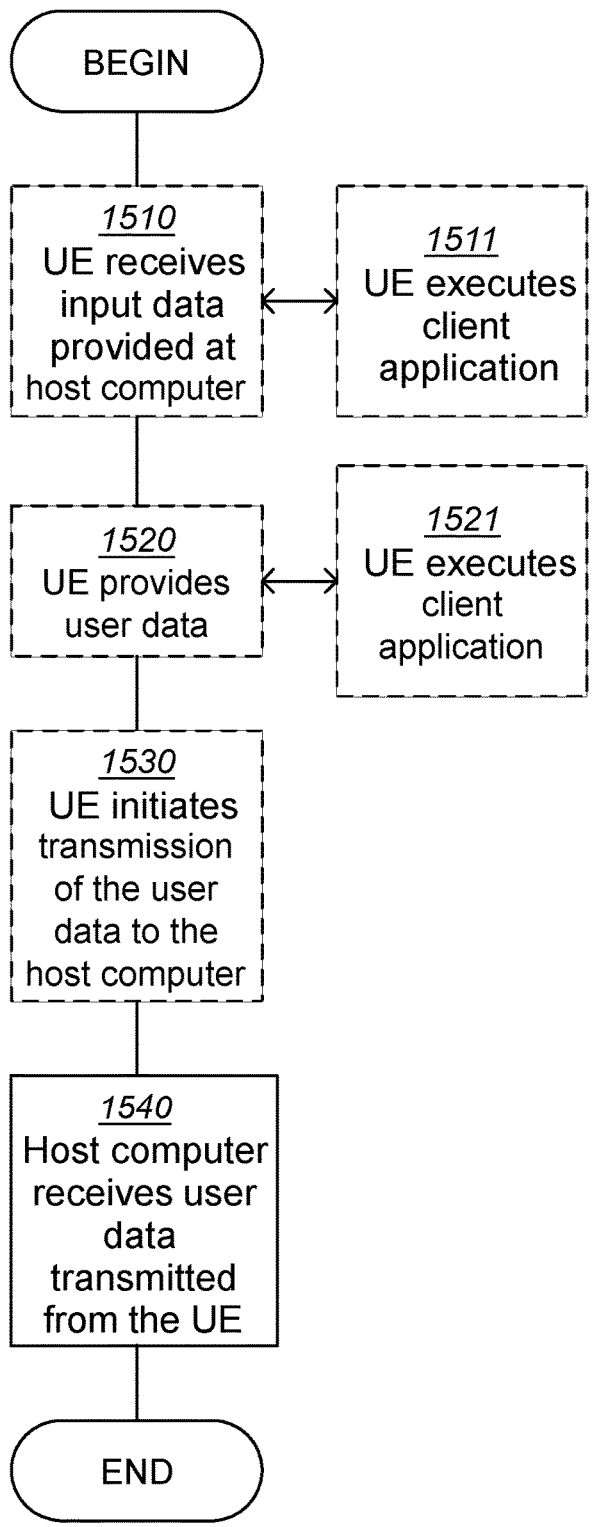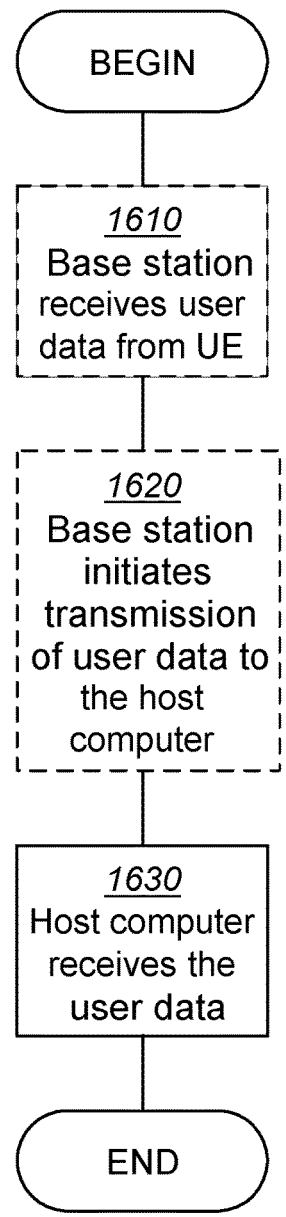
FIG. 15
FIG. 16

WIRELESS DEVICE, NETWORK NODE, AND METHODS PERFORMED THEREBY, FOR HANDLING UPLINK COMMUNICATION

TECHNICAL FIELD

The present disclosure relates generally to a wireless device, and methods performed thereby, for handling uplink communication to a network node. The present disclosure also relates generally to a network node and methods performed thereby for handling uplink communication by a wireless device.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., gNB, evolved Node B ("eNB"), "eNodeB", "NodeB", "B node", Transmission Point (TP), or Base Transceiver Station (BTS), depending on the technology and terminology used. The base stations may be of different classes such as e.g., Wide Area Base Stations, Medium Range Base Stations, Local Area Base Stations, Home Base Stations, pico base stations, etc. . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction, i.e., from the wireless device to the base station.

The standardization organization 3GPP is currently in the process of specifying a New Radio Interface called New Radio (NR) or 5G-UTRA, as well as a Fifth Generation (5G) Packet Core Network, which may be referred to as Next Generation (NG) Core Network, abbreviated as NG-CN, NGC or 5G CN.

Internet of Things (IoT)

The Internet of Things (IoT) may be understood as an internetworking of communication devices, e.g., physical devices, vehicles, which may also referred to as "connected devices" and "smart devices", buildings and other items-embedded with electronics, software, sensors, actuators, and network connectivity that may enable these objects to collect and exchange data. The IoT may allow objects to be sensed and/or controlled remotely across an existing network infrastructure.

"Things," in the IoT sense, may refer to a wide variety of devices such as heart monitoring implants, biochip transponders on farm animals, electric clams in coastal waters, automobiles with built-in sensors, DNA analysis devices for environmental/food/pathogen monitoring, or field operation devices that may assist firefighters in search and rescue operations, home automation devices such as the control and automation of lighting, heating, e.g. a "smart" thermostat, ventilation, air conditioning, and appliances such as washer, dryers, ovens, refrigerators or freezers that may use telecommunications for remote monitoring. These devices may collect data with the help of various existing technologies and then autonomously flow the data between other devices.

It is expected that in a near future, the population of IoT devices will be very large. Various predictions exist, among which one assumes that there will be >60000 devices per square kilometer, and another assumes that there will be 1000000 devices per square kilometer. A large fraction of these devices are expected to be stationary, e.g., gas and electricity meters, vending machines, etc.

Machine Type Communication (MTC)

Machine Type Communication (MTC) has in recent years, especially in the context of the Internet of Things (IoT), shown to be a growing segment for cellular technologies. An MTC device may be a communication device, typically a wireless communication device or simply user equipment, that is a self and/or automatically controlled unattended machine and that is typically not associated with an active human user in order to generate data traffic. An MTC device may be typically more simple, and typically associated with a more specific application or purpose, than, and in contrast to, a conventional mobile phone or smart phone. MTC involves communication in a wireless communication network to and/or from MTC devices, which communication typically may be of quite different nature and with other requirements than communication associated with e.g. conventional mobile phones and smart phones. In the context of and growth of the IoT, it is evident that MTC traffic will be increasing and thus needs to be increasingly supported in wireless communication systems.

Small Data Transmission

NR supports Radio Resource Control (RRC)_INACTIVE state, and UEs with infrequent, e.g., periodic and/or non-periodic, data transmission may be generally maintained by the network in the RRC_INACTIVE state. Until Rel-16, the RRC_INACTIVE state does not support data transmission. Hence, the UE has to resume the connection, that is, move to RRC_CONNECTED state for any DL, that is, Mobile Terminated (MT) and UL, that is, Mobile Originated (MO) data. Connection setup and subsequently release to INACTIVE state may happen for each data transmission, however small and infrequent the data packets may be. This results in unnecessary power consumption and signalling overhead.

Specific examples of small and infrequent data traffic may include the following use cases. In smartphone applications: a) traffic from Instant Messaging (IM) services, e.g., whatsapp, QQ, wechat etc, b) heart-beat/keep-alive traffic from IM/email clients and other apps, and/or c) push notifications from various applications. In non-smartphone applications: a) traffic from wearables, e.g., periodic positioning information etc, b) sensors, e.g., industrial wireless sensor networks transmitting temperature, pressure readings periodically or in an event triggered manner etc, and/or c) smart meters and smart meter networks sending periodic meter readings.

As noted in 3GPP TS 22.891, v14.2.0, the NR system may be required to: be efficient and flexible for low throughput short data bursts, support efficient signalling mechanisms, e.g. signalling may be less than payload, and/or reduce signalling overhead in general.

Signalling overhead from INACTIVE state UEs for small data packets is a general problem and will become a critical issue with more UEs in NR, not only for network performance and efficiency, but also for the UE battery performance. In general, any device that has intermittent small data packets in INACTIVE state may benefit from enabling small data transmission in INACTIVE.

The key enablers for small data transmission in NR, namely the INACTIVE state, 2-step, 4-step Random Access Channel (RACH) and configured grant type-1 have already been specified as part of Rel-15 and Rel-16.

In 3GPP Release 8, the Evolved Packet System (EPS) was specified. EPS is based on the Long-Term Evolution (LTE) radio network and the Evolved Packet Core (EPC). It was originally intended to provide voice and mobile broadband (MBB) services, but has continuously evolved to broaden its functionality. Since Release 13, NarrowBand IoT (NB-IoT) and LTE for Machine Type Communication (LTE-M) are part of the LTE specifications and provide connectivity to massive machine type communications (mMTC) services.

In 3GPP Release 15, the first release of the 5G system (5GS) was specified. This is a new generation's radio access technology intended to serve use cases such as enhanced mobile broadband (eMBB), ultra-reliable and low latency communication (URLLC) and mMTC. 5G may be understood to comprise the New Radio (NR) access stratum interface and the 5G Core Network (5GC). The NR physical and higher layers may be understood to reuse parts of the LTE specification, and to that, add components that may be needed when motivated by new use cases. One such component may be the introduction of a sophisticated framework for beam forming and beam management to extend the support of the 3GPP technologies to a frequency range going beyond 6 GHz.

A new NR Release 17 Work Item (WI) RP-193252 'New Work Item on NR small data transmissions in INACTIVE state' [1] has been approved in 3GPP with the focus of optimizing the transmission for small data payloads by reducing the signaling overhead. The WI contains an objective to support Physical Uplink Shared Channel (PUSCH) data transmission for UEs in RRC inactive mode based on an earlier configured grant.

For the RRC_INACTIVE State:
UL small data transmissions for RACH-based schemes (i.e. 2-step and 4-step RACH):

General procedure to enable User Plane (UP) data transmission for small data packets from INACTIVE state (e.g. using MSGA or MSG3) [RAN2].

Enable flexible payload sizes larger than the Rel-16 Common Control Channel (CCCH) message size that is possible currently for INACTIVE state for MSGA and MSG3 to support UP data transmission in UL (actual payload size can be up to network configuration) [RAN2]

Context fetch and data forwarding (with and without anchor relocation) in INACTIVE state for RACH-based solutions [RAN2, RAN3]

Note 1: The security aspects of the above solutions should be checked with SA3.

Transmission of UL data on pre-configured PUSCH resources (i.e. reusing the configured grant type 1)—when Time Alignment (TA) is valid General procedure for small data transmission over configured grant type 1 resources from INACTIVE state [RAN2]

Configuration of the configured grant type 1 resources for small data transmission in UL for INACTIVE state [RAN2]

This may be understood to mean that three solutions for Small Data may need to be specified in Rel-17, based on 4-step RACH, 2-step RACH, and on pre-configured PUSCH respectively.

FIG. 1 is a schematic diagram illustrating configured grant based PUSCH transmission for valid TA. In step 11, a UE may enter the RRC connected mode, and receive, at step 12, a configured grant for a PUSCH transmission in a future RRC inactive mode, which may include a TA command. At step 13, the UE may subsequently enter the RRC inactive mode. Whenever the UE may have data to transmit, at step 14, if the TA is valid, the UE may perform a PUSCH transmission based on the configured grant, that is, using the configured grant.

Timing Advance

Before initiating a connection to a 3GPP network, a device may synchronize its receiver to the downlink frame structure using e.g., the primary synchronization signals (PSS) and secondary synchronization signals (SSS). After transmitting an uplink physical random access channel (PRACH) preamble, it may, as response, receive a first downlink message containing a timing advance (TA) command that may be understood to allow it to adjust the timing of its transmitter to the uplink frame structure. The TA value that may be comprised in the TA command may be understood to correspond to the round trip time, that is, the time it may take a radio wave to travel from the device to the gNB, or the transmitting base station, and back. A stationary device may hence be expected to receive the same TA configuration across consecutive connection attempts.

An NR device may be expected to obtain a fresh TA configuration every time it makes the transition from idle or inactive mode to connected mode. In idle or inactive mode, the system has so far not expected the devices to maintain a valid TA configuration.

For a 15 kHz subcarrier spacing, the TA configuration may be set with a granularity of ~0.52 µs. This may be understood to imply that the smallest change in distance between the gNB and the device that may trigger an update of the TA configuration may correspond to ~80 meters. The TA granularity may be reduced by a factor 2 for every doubling in the configured subcarrier spacing, relative 15 KHz.

A gNB may tolerate an overall uplink timing error that may be in the range of the cyclic prefix used in the transmission of the uplink channels. The NR normal cyclic prefix, typically used, may be of length 4.7 us for 15 kHz subcarrier spacing, which may be understood to imply that a device at least may expect to receive an updated TA configuration after moving ~700 meters closer, or away, from its serving gNB. The NR specifications may also support an extended cyclic prefix, which may be understood to be less prone to uplink timing errors at the cost of an increased overhead. The cyclic prefix may be reduced by a factor 2 for every doubling in the configured subcarrier spacing, relative 15 kHz.

In the case of a Random Access Response (RAR), a timing advance command TA may range from 0 to 3846. In other cases, e.g., in connected mode, the range of the TA value may be between 0 and 63, and may be understood to be an adjustment of the already existing TA. The expression for the timing advance value $N_{TA}$ to be used may also be different for both cases, see highlighted text below.

Based on these expressions, TA=0 implies $N_{TA}=0$ during the random-access stage. That is, no timing adjustment may be applied. However, in connected mode, TA=0 may be understood to not imply N_TA=0. Since the UE may be understood to be configured with pre-configured PUSCH in connected mode, configuring TA=0 would lead to some timing adjustment at the UE. If no timing adjustment is needed, then TA may be understood to need to be 31. In this case, $N_{TA}^{new} = N_{TA}^{old}$.

From TS 38.213, v 16.1.0:
In case of random access response, a timing advance command [11, TS 38.321], $T_A$, for a TAG indicates $N_{TA}$ values by index values of $T_A=0, 1, 2 \ldots 3846$, where an amount of the time alignment for the TAG with SCS of $2^\mu \cdot 15$ KHz is $N_{TA}=T_A \cdot 16 \cdot 64/2^\mu$. $N_{TA}$ is defined in [4, TS 38.211] and is relative to the SCS of the first uplink transmission from the UE after the reception of the random access response.
In other cases, a timing advance command [11, TS 38.321], $T_A$, for a TAG indicates adjustment of a current $N_{TA}$ value, $N_{TA,old}$, to the new $N_{TA}$ value, $N_{TA,new}$, by index values of $T_A=0, 1, 2 \ldots, 63$, where for a SCS of $2^\mu \cdot 15$ kHz, $N_{TA,new}=N_{TA,old}+(T_A-31) \cdot 16 \cdot 64/2^\mu$.

FIG. 2 is a schematic diagram illustrating aspects of TA according to existing methods. As illustrated in the Figure the difference between the beginning of transmission of an uplink frame I and the beginning of reception of a subsequent downlink frame I is the the timing advance value $N_{TA}$, an offset of such value, $N_{TA,offset}$, and a constant, $T_c$.

For 2-step RACH, when MsgA PUSCH transmission may use TA=0, it may be understood to mean that the UE may be using the uplink timing corresponding to the downlink frame structure, as determined at the UE by detecting the Synchronization Signal Block (SSB). 'TA=0' in this disclosure may refer to this case.

LTE Receive Signal Reference Power (RSRP)

In LTE, RSRP may be understood to be estimated by the UE based on cell specific reference signals (CRS). The CRS may always be transmitted over the full system bandwidth, in a transmission beam defining the coverage of a cell. The RSRP may be determined as a function of the base station (BS) output power $P_{BS}$, the BS antenna gain $G_{TX}$, the signal propagation loss, and the UE antenna aperture AuE. This is shown in Equation 1 (Eq. 1), where line-of-sight conditions are assumed meaning that the propagation loss at a distance d equals $$\frac{1}{4\pi d^2}: RSRP = 10\log_{10}\left(p_{BS} \cdot g_{TX} \cdot \frac{1}{4\pi d^2} \cdot a_{UE}\right) = \quad \text{(Eq. 1)}$$

$$P_{BS} + G_{TX} + 10\log_{10}\left(\frac{1}{4\pi d^2}\right) + A_{UE}$$

Note that capital letters denote logarithmic values, while linear values are denoted by small letters. By comparing the transmitted power by the BS with the RSRP, a UE may determine the path gain PG based on the measured RSRP which decreases with the distance d, under the assumption that the BS antenna gain, and the UE antenna aperture may be assumed to be independent of the distance d:

$$PG(d) = P_{BS} - RSRP(d) = G_{TX} + 10\log_{10}\left(\frac{1}{4\pi d^2}\right) + A_{UE} \quad \text{(Eq. 2)}$$

In reality, this may be understood to be a simplification, since the BS antenna may be understood to point its beam towards a certain direction in the cell, meaning that also $G_{TX}$ in practice may become dependent on d, with a local maximum at a certain distance $d_{max}$ from the BS. This effect is illustrated in FIG. 3, where it is also shown that the path gain (PG) characteristics, depicted at the bottom of FIG. 3, may be expected to be dominated by signal propagation gain, depicted by the top graph of FIG. 3, and consequently be dependent on the distance d.

FIG. 3 is a schematic diagram illustrating the components of the path gain in an LTE system. Path gain is equal to the signal propagation gain, the eNB transmit (Tx) antenna beam gain and the UE Rx antenna aperture. In LTE PUR, RSRP may be used as metric for detecting that a UE has moved a distance, and that may be used as trigger for detecting that a new TA may be needed.

LTE Preconfigured Uplink Resources (PUR)

LTE-M and NB-IoT Release 16 may support the Preconfigured uplink resources (PUR) feature. PUR may be understood to support data transmission from RRC idle mode based on a preconfigured grant, under the requirement that the TA command received in the grant at a time $t_0$ may be validated at the time $t_N$ of PUSCH transmission N.

The UE may be configured to compare the difference in RSRP measured at to with that measured at $t_N$ for determining if the UE has moved. If the difference, i.e., RSRP $(t_0)$–RSRP $(t_N)$, exceeds a configured threshold, then the UE may be understood to need to take that as a sign of having moved so far that the configured TA is no longer valid, and initiate a request for a new grant comprising a fresh TA command. Two thresholds may be used to capture the difference in the RSRP change depending on if the UE moves towards or away from the base station.

2-step RACH

In NR Rel-16, a new procedure for random access was introduced; 2-step RACH which has reduced signaling exchange, and hence latency, compared to the conventional 4-step RACH supported in Rel-15, and in LTE. FIG. 4 is a schematic diagram illustrating 2-step RACH. Simplified, the 2-step RACH procedure may be said to group Msg1 and Msg3, of 4-step RACH, to a new MsgA 41, and group Msg2 and Msg4 in to a new MsgB 42. As depicted in FIG. 4, MsgA 41 comprises transmission of a preamble 43 and a PUSCH 44 from the UE 45 to the gNB 46. The MsgB 42 from the gNB 46 comprises a RAR 47 and a Contention resolution and RRCRelease 48.

2-step RACH may be understood to create a mapping between the preamble 43 used and the PUSCH 44 used for MsgA transmission by the UE 45 to the gNB 46. Since no feedback to the UE 45 may be understood to be possible, providing a Timing Advance (TA) to the UE 45 for uplink resource allocation may be understood to not be possible before the PUSCH 44 transmission. Therefore, TA=0 may be assumed, and the out-of-sync may be covered by the cyclic prefix of the PUSCH transmission. Optionally, guard time and guard bands may be optionally configurable, e.g. to support larger cell sizes.

SUMMARY

As part of the development of embodiments herein, one or more challenges with the existing technology will first be identified and discussed.

The second objective on a small data solution based on preconfigured PUSCH is still very open, and it is not clear that is will be a NR version of the LTE 'Preconfigured Uplink Resources' (PUR) feature. Further, it is unclear how the aspect " . . . when TA is valid" will be solved.

It is an object of embodiments herein to improve the handling of handling uplink communication. It is a particular object of embodiments herein to improve the handling uplink communication to a network node in a wireless communications network.

According to a first aspect of embodiments herein, the object is achieved by a method, performed by a wireless device. The method is for handling uplink communication to a network node. The wireless device and the network node operate in a wireless communications network. The wireless device obtains a first configuration. The first configuration is of a set of periodic uplink time-frequency resources for uplink communication to the network node. The first configuration is specific for the wireless device. The first configuration configures the set of periodic uplink time-frequency resources to support at least one of the following options. As a first option, a first procedure comprising a first Physical Uplink Shared Channel (PUSCH), transmission of a Message A (MsgA) transmission. As a second option, a second procedure comprising uplink transmissions of, or corresponding to, a two-step Random Access Channel (RACH) procedure comprising, a first Physical Random Access Channel (PRACH), transmission and a second PUSCH transmission. As a third option, a third procedure comprising uplink transmissions of, or corresponding to, a four-step RACH procedure comprising a second PRACH transmission, and a third PUSCH transmission. A Timing Advance (TA) value of at least one of the first PUSCH transmission, the second PUSCH transmission, the third PUSCH transmission, the first PRACH transmission and the second PRACH transmission is at least one of the following further options. As a first further option, configurable by the network node or another network node, independently between the PUSCH and the PRACH transmissions. As a second further option, configured to be zero, and wireless device is configured to refrain from validating the TA value. As a third further option, explicitly configured and validated before transmission from the inactive or idle state.

According to a second aspect of embodiments herein, the object is achieved by a method, performed by the network node. The method is for handling uplink communication by the wireless device. The network node and the wireless device operate in the wireless communications network. The network node provides, to the wireless device 130, the first configuration. The first configuration is of the set of periodic uplink time-frequency resources for uplink communication by the wireless device. The first configuration is specific for the wireless device. The first configuration configures the set of periodic uplink time-frequency resources to support at least one of the following options. As a first option, the first procedure comprising the first PUSCH, transmission of the MsgA transmission. As a second option, the second procedure comprising uplink transmissions of, or corresponding to, the two-step RACH procedure comprising, the first PRACH, transmission and the second PUSCH transmission. As a third option, the third procedure comprising uplink transmissions of, or corresponding to, the four-step RACH procedure comprising the second PRACH transmission, and the third PUSCH transmission. The TA value of at least one of the first PUSCH transmission, the second PUSCH transmission, the third PUSCH transmission, the first PRACH transmission and the second PRACH transmission is at least one of the following further options. As a first further option, configurable by the network node or another network node, independently between the PUSCH and the PRACH transmissions. As a second further option, configured to be zero, and the wireless device is configured to refrain from validating the TA value. As a third further option, explicitly configured and validated before transmission from the inactive or idle state.

According to a third aspect of embodiments herein, the object is achieved by the wireless device. The wireless device is handling uplink communication to the network node. The wireless device and the network node are configured to operate in the wireless communications network. The wireless device is further configured to obtain the first configuration of the set of periodic uplink time-frequency resources for uplink communication to the network node. The first configuration is configured to be specific for the wireless device. The first configuration is configured to configure the set of periodic uplink time-frequency resources to support at least one of the following options. As a first option, the first procedure comprising the first PUSCH transmission of the MsgA transmission. As a second option, the second procedure comprising uplink transmissions of, or corresponding to, the two-step RACH procedure comprising the first PRACH transmission and the second PUSCH transmission. As a third option, the third procedure comprising uplink transmissions of, or corresponding to, the four-step RACH procedure comprising the second PRACH transmission, and the third PUSCH transmission. The TA value of at least one of the first PUSCH transmission, the second PUSCH transmission, the third PUSCH transmission, the first PRACH transmission and the second PRACH transmission is at least one of the following further options. As a first further option, configured to be configurable by the network node or another network node, independently between the PUSCH and the PRACH transmissions. As a second further option, configured to be zero, and the wireless device is configured to refrain from validating the TA value. As a third further option, explicitly configured and validated before transmission from the inactive or idle state.

According to a fourth aspect of embodiments herein, the object is achieved by the network node. The network node is for handling uplink communication by the wireless device. The network node and the wireless device are configured to operate in the wireless communications network. The network node is further configured to provide, to the wireless device, the first configuration of the set of periodic uplink time-frequency resources for uplink communication by the wireless device. The first configuration is configured to be specific for the wireless device. The first configuration is configured to configure the set of periodic uplink time-frequency resources to support at least one of the following options. As a first option, the first procedure comprising the first PUSCH transmission of the MsgA transmission. As a second option, the second procedure comprising uplink transmissions of, or corresponding to, the two-step RACH procedure comprising, the first PRACH transmission, and the second PUSCH transmission. As a third option, the third procedure comprising uplink transmissions of, or corresponding to, the four-step RACH procedure comprising a second PRACH transmission, and the third PUSCH transmission. The TA value of at least one of the first PUSCH transmission, the second PUSCH transmission, the third PUSCH transmission, the first PRACH transmission and the second PRACH transmission is configured to be at least one of the following further options. As a first further option, configured to be configurable by the network node or another network node, independently between the PUSCH and the PRACH transmissions. As a second further option, configured to be zero, wherein the wireless device is configured to refrain from validating the TA value. As a third further option, explicitly configured and validated before transmission from the inactive or idle state.

By the wireless device obtaining the first configuration, which is specific to the wireless device, configuration flexibility may be achieved, thereby optimizing periodic uplink communication in small cells, or for wireless devices being close to the network node.

By the wireless device obtaining the first configuration according to the first further option, wherein the TA value of at least one of the PUSCH transmissions and the first PRACH transmissions are configured to be independently configurable, The PRACH and PUSCH TA values may take on the same, or different values. The PRACH TA may e.g., be set to 0, that is, no TA compensation may be configured, while the PUSCH TA may be configured to facilitate uplink time synchronization according to the anticipated round-trip time. The network may thereby be enabled to use the PRACH preamble to estimate the actual absolute TA value, and may be enabled to use a downlink transmission to configure needed adjustments of the wireless device pre-configured TA values.

The benefit of using TA 0 for the PRACH may be understood to be that the preamble transmission may always be received within the gNB PRACH receiver window, even if the wireless device may have moved since the TA pre-configuration, and the TA value configured for the MsgA PUSCH may be outdated. This may allow the network node, e.g., a gNB, to always perform a TA estimate on the PRACH preamble. It may also reduce the interference from the PRACH channel to other configured channels, e.g., PUSCH, surrounding the PRACH in time and frequency. To set the TA value to 0 may be the default behaviour for the PRACH transmission. Then, the PRACH based TA estimate may be used to reconfigure the PUSCH TA if it turned out to be incorrect.

For some wireless devices, in agreement with the second further option, TA=0 may be able to be configured on a wireless device-specific basis, and in addition, the TA validation may be omitted in order to obtain power savings at the wireless device. Hence, configuration flexibility may be enabled to be achieved.

Likewise, by obtaining the first configuration, configuration flexibility may be also achieved according to the third further option, in a wireless-device specific manner.

BRIEF DESCRIPTION OF THE DRAWINGS

Examples of embodiments herein are described in more detail with reference to the accompanying drawings, according to the following description.

FIG. 13 is a flowchart depicting embodiments of a method in a communications system including a host computer, a base station and a user equipment, according to embodiments herein.

FIG. 14 is a flowchart depicting embodiments of a method in a communications system including a host computer, a base station and a user equipment, according to embodiments herein.

FIG. 15 is a flowchart depicting embodiments of a method in a communications system including a host computer, a base station and a user equipment, according to embodiments herein.

FIG. 16 is a flowchart depicting embodiments of a method in a communications system including a host computer, a base station and a user equipment, according to embodiments herein.

DETAILED DESCRIPTION

Certain aspects of the present disclosure and their embodiments may provide solutions to these or other challenges. Embodiments herein may be generally understood to relate to different aspects of configurable preconfigured-PUSCH Small Data.

The 'Small Data transmission based on pre-configured PUSCH' feature to be introduced in Rel-17 has so far only considered the configuration of a TA for the UE and that UEs may be required to evaluate the TA before any data transmission, that is, much like the Rel-16 PUR for NB-IoT/LTE-M. As a simplified overview, embodiments herein instead introduce the possibility to configure the UE with TA=0 as is done for 2-step RACH, and/or to remove the TA validation criteria. Further, the main part of the configuration may be common, and may be left as a choice for the network to either configure the UE with TA=0 and no TA validation criteria, or with TA+0 and TA validation criteria.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Figure 1:
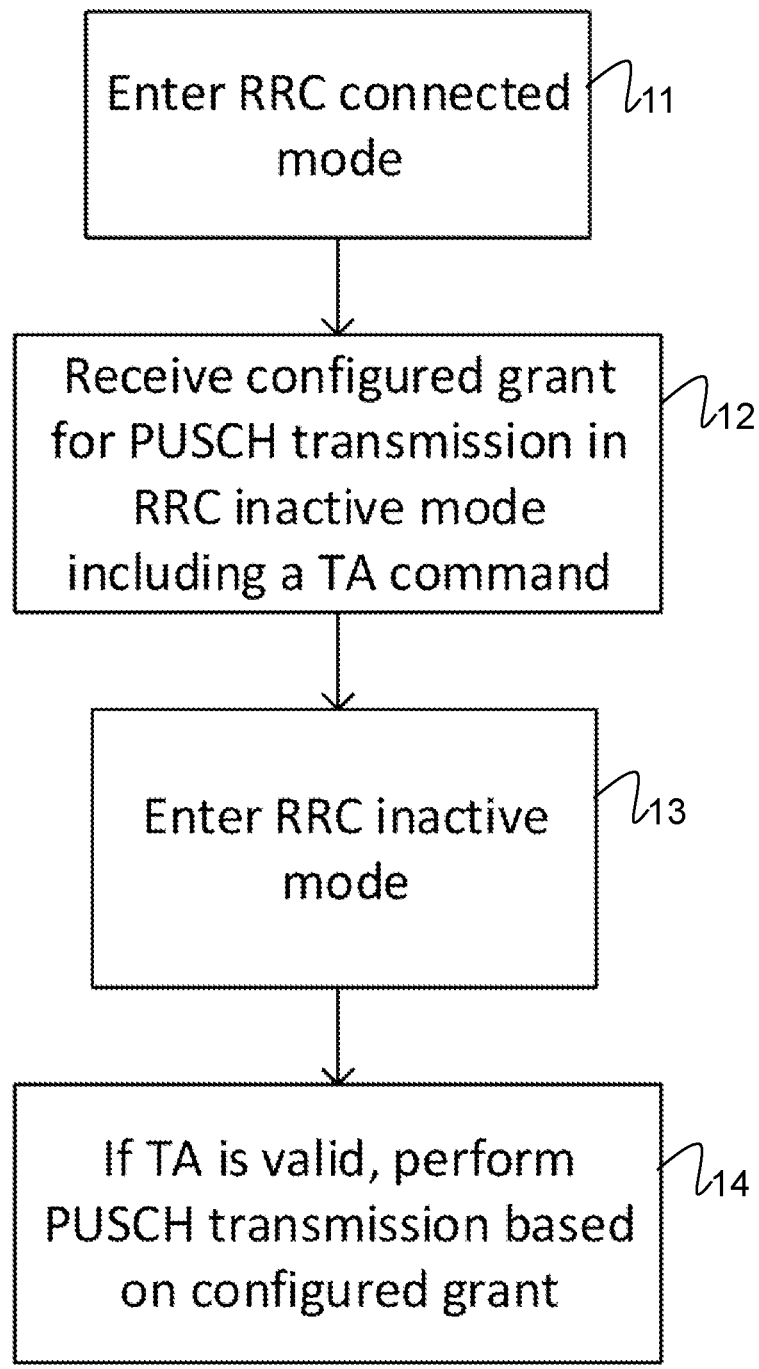
FIG. 1 is a schematic diagram illustrating configured grant based PUSCH transmission for valid TA, according to existing methods.
Figure 2:
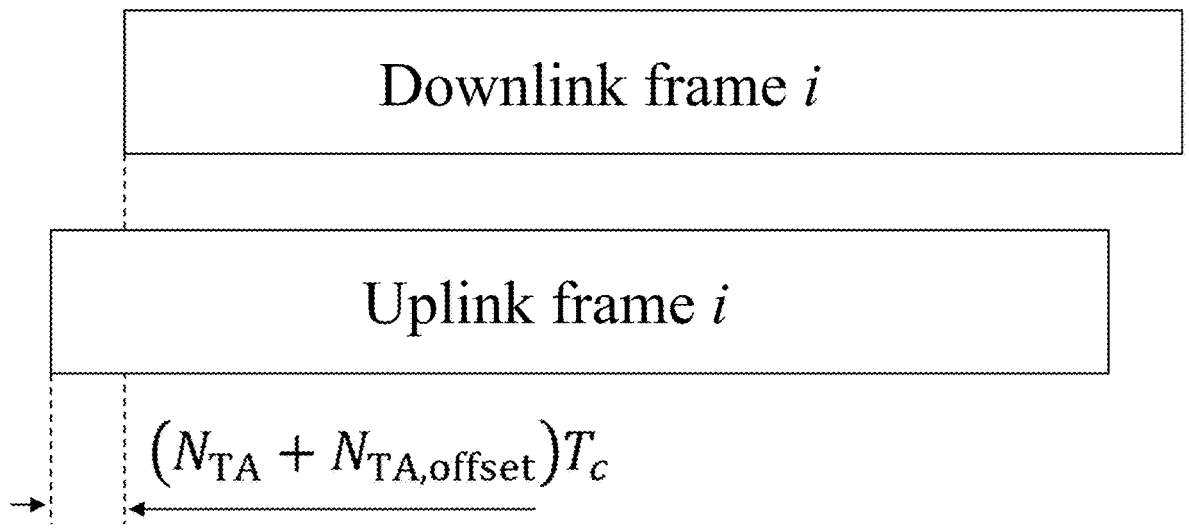
FIG. 2 is a schematic diagram illustrating some aspects of TA, according to existing methods.
Figure 4:
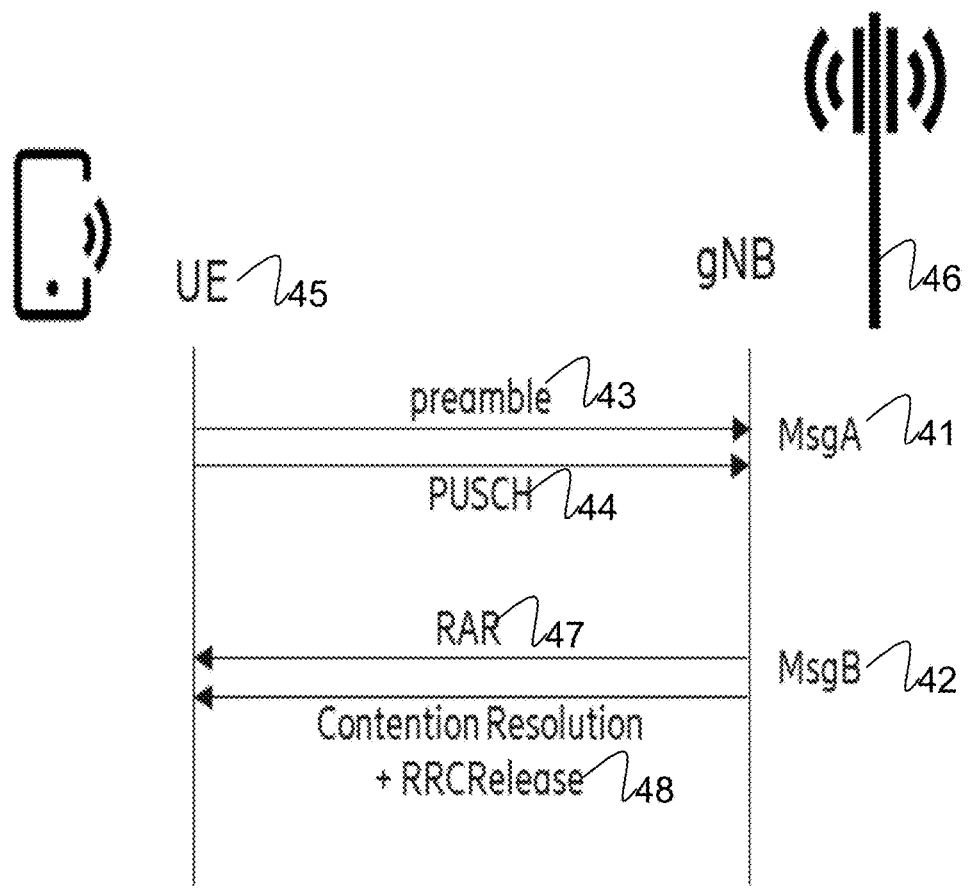
FIG. 4 is a schematic diagram illustrating 2-step RACH, according to existing methods.
Figure 3:
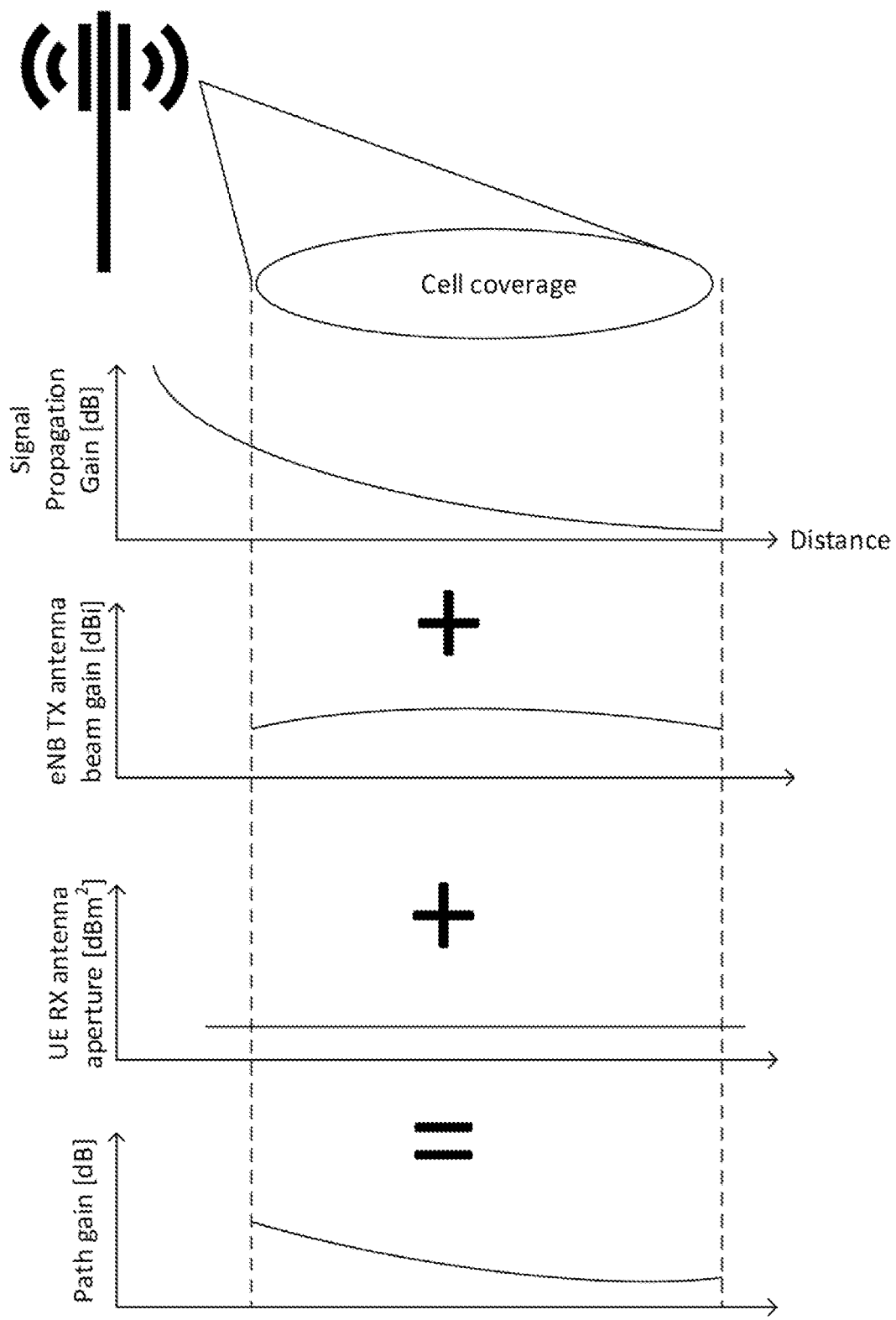
FIG. 3 is a schematic diagram illustrating the components of the path gain in an LTE system, according to existing methods.
Figure 5:
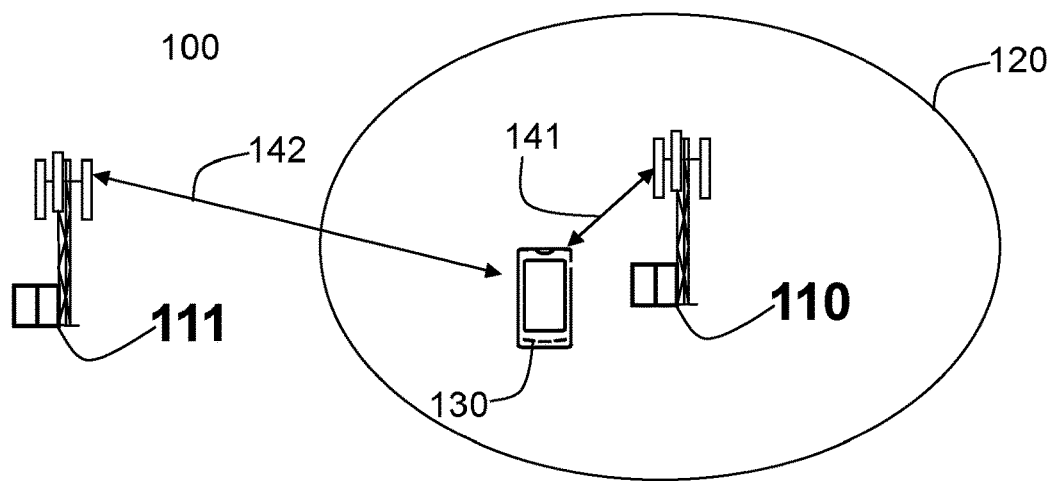
FIG. 5 is a schematic diagram an example of a wireless communications network, according to embodiments herein.
Figure 5:
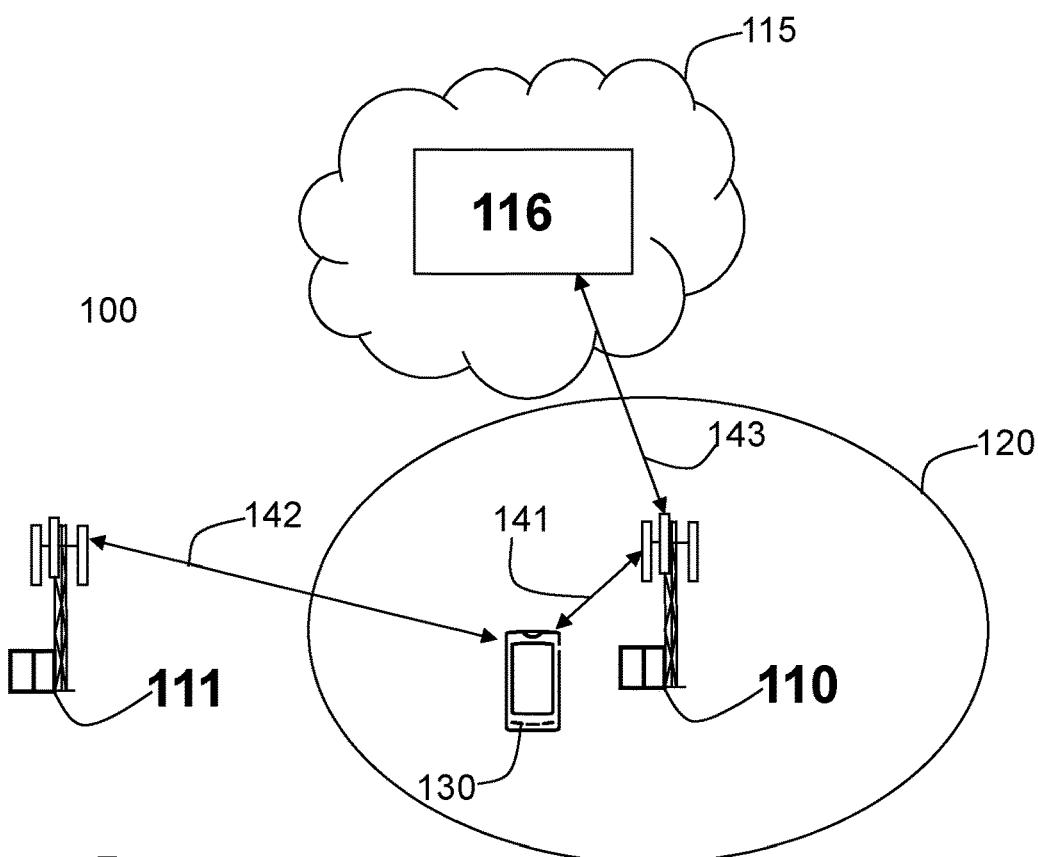

FIG. 1 depicts two non-limiting examples of a wireless network or wireless communications network 100, sometimes also referred to as a wireless communications system, cellular radio system, or cellular network, in which embodiments herein may be implemented. The wireless communications network 100 may typically be support MTC, eMTC, IoT and/or NB-IoT. The wireless communications network 100 may be a 5G system, 5G network, or Next Gen System or network. In other examples, the wireless communications network 100 may instead, or in addition, support other technologies such as, for example, Long-Term Evolution (LTE), e.g. LTE-M, LTE Frequency Division Duplex (FDD), LTE Time Division Duplex (TDD), LTE Half-Duplex Frequency Division Duplex (HD-FDD), LTE operating in an unlicensed band, such as LTE LAA, eLAA, feLAA and/or MulteFire. Yet in other examples, the wireless communications network 100 may support other technologies such as, for example Wideband Code Division Multiple Access (WCDMA), Universal Terrestrial Radio Access (UTRA) TDD, Global System for Mobile communications (GSM) network, GSM/Enhanced Data Rates for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system.

The wireless communications network 100 may comprise a plurality of network nodes, whereof a network node 110 and another network node 111 are depicted in the non-limiting example of FIG. 1. Any of the network node 110 and the another network node 111 is a radio network node. That is, a transmission point such as a radio base station, for example a gNB, an eNB, an eNodeB, or a Home Node B, a Home eNode B, or any other network node with similar features capable of serving a user equipment, such as a wireless device or a machine type communication device, in the wireless communications network 100. In some examples, such as that depicted in FIG. 1 *b* for the network node 110, any of the network node 110 and the another network node 111 may be a distributed node, and may partially perform its functions in collaboration with a virtual node 116 in a cloud 115.

The wireless communications network 100 may cover a geographical area, which in some embodiments may be divided into cell areas, wherein each cell area may be served by a radio network node, although, one radio network node may serve one or several cells. In the example of FIG. 1, the network node 110 serves a cell 120. The another network node 111 may serve a respective cell, although this is not depicted in the Figure to simplify it. Any of the network node 110 and the another network node 111 may be of different classes, such as, e.g., macro eNodeB, home eNodeB or pico base station, based on transmission power and thereby also cell size. In some examples, the any of the network node 110 and the another network node 111 may serve receiving nodes with serving beams. Any of the network node 110 and the another network node 111 may support one or several communication technologies, and its name may depend on the technology and terminology used. Any of the radio network nodes that may be comprised in the communications network 100 may be directly connected to one or more core networks.

A plurality of wireless devices may be located in the wireless communication network 100, whereof a wireless device 130, is depicted in the non-limiting example of FIG. 1. The wireless device 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, a sensor, IoT device, NB-IoT device, device equipped with a wireless interface, such as a printer or a file storage device, modem, or any other radio network unit capable of communicating over a radio link in a communications system. The wireless device 130 comprised in the wireless communications network 100 may be enabled to communicate wirelessly in the wireless communications network 100. The communication may be performed e.g., via a RAN, and possibly the one or more core networks, which may comprised within the wireless communications network 100.

The wireless device 130 may be configured to communicate within the wireless communications network 100 with the network node 110 over a first link 141, e.g., a radio link. The wireless device 130 may be configured to communicate within the wireless communications network 100 with the another network node 111 over a second link 142, e.g., a radio link. The network node 110 may be configured to communicate within the wireless communications network 100 with the virtual network node 116 over a third link 143, e.g., a radio link or a wired link.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", etc., herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a wireless device, such as the wireless device 130, e.g., a 5G UE or a UE, and embodiments related to a network node, such as the network node 110, e.g., a gNB.

Some embodiments herein will now be further described with some non-limiting examples.

In the following description, any reference to a/the UE, or simply "UE" may be understood to equally refer the wireless device 130; any reference to a/the gNB, a/the NW and/or a/the network may be understood to equally refer to the network node 110.

Embodiments of a method, performed by the wireless device 130, will now be described with reference to the flowchart depicted in FIG. 6. The method may be understood to be for handling uplink communication to the network node 110. The wireless device 130 and the network node 110 operate in the wireless communications network 100.

In some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

Uplink communication may comprise uplink transmission of data.

In some embodiments, a size of a buffer for the uplink communication of the wireless device 130 may be smaller than a threshold. This may be understood to mean that the data comprised in the uplink communication may be "Small Data".

The data may be user plane data.

The method may comprise one or more of the following actions.

Several embodiments are comprised herein. In some embodiments all the actions may be performed. In some embodiments, one or more actions may be performed. It should be noted that the examples herein may be not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the wireless device 130 is depicted in FIG. 6. Some actions may be performed in a different order than that shown in FIG. 6. In FIG. 6, optional actions are represented with dashed lines.

In the text below, a/the PRACH preamble may be understood or be replaced by a/the "preamble".

Action 601

In this Action 601, the wireless device 130 obtains a configuration, e.g., a first configuration.

Obtaining in this Action 601 may comprise, retrieving or fetching from a memory, determining or calculating, and/or receiving, e.g., from the network node 110, e.g., via the first link 141, or from the another network node 111, e.g., via the second link 142.

The first configuration is of a set of periodic uplink time-frequency resources, e.g., one or more uplink time-frequency resources, for uplink communication to the network node 110.

The time-frequency resources may be, e.g., ODFM symbols.

The uplink communication may comprise data, which may be user plane data.

The first configuration is specific for the wireless device 130. That is, the first configuration may be understood to be UE-specific. The uplink communication to the network node 110 may be during an inactive, or idle, state or mode of the wireless device 130. The inactive state may be, e.g., as defined in 5G or in a younger system having equivalent functionality.

The first configuration configures the set of periodic uplink time-frequency resources to support least one of: a) a first procedure comprising a first PUSCH transmission of a Message A (MsgA) transmission, b) a second procedure comprising uplink transmissions of, or corresponding to, a two-step Random Access CHannel (RACH) procedure comprising, a first Physical Random Access CHannel (PRACH) transmission, e.g., a first PRACH preamble transmission, and a second PUSCH transmission; that is, the second procedure may be said to be "two-step RACH procedure-based", and c) a third procedure comprising uplink transmissions of, or corresponding to, a four-step RACH procedure comprising a second PRACH transmission, e.g., a second PRACH preamble transmission, and a third PUSCH transmission; that is, the third procedure may be said to be "four-step RACH procedure-based".

A Timing Advance (TA) value of at least one of the first PUSCH transmission, the second PUSCH transmission, the third PUSCH transmission, the first PRACH transmission and the second PRACH transmission is at least one of the following options. According to a first option i), configurable by the network node 110 or another network node 111, independently between the PUSCH and the PRACH transmissions. According to a second option ii), configured to be zero, wherein the wireless device 130 is configured to refrain from validating the TA value; this may be, e.g., during the course of the second procedure. According to a third option iii), explicitly configured and validated before transmission from the inactive or idle state.

The TA according to i, ii, and/or iii may be specified in the first configuration.

The uplink communication may be configured to be performed with the proviso that the size of the buffer of the wireless device 130 is smaller than a threshold. The buffer may be a buffer for transmission, which may be referred to herein as a transmit buffer.

The set of periodic uplink time-frequency resources for uplink communication may be in one or more PUSCH uplink grants.

In some examples, the set of periodic uplink time-frequency resources for uplink communication to the network node 110 may be "pre-configured PUSCH resources".

In some embodiments, the first configuration may further configure the wireless device 130 with at least one of: i) a longer cyclic prefix (CP) than a currently used cyclic prefix by the wireless device 130, wherein the longer prefix may be one of: specific for the wireless device 130, and non-specific for the wireless device 130, ii) a guard time, wherein the guard time may be one of: specific for the wireless device 130, and non-specific for the wireless device 130, and iii) a guard band, wherein the guard band may be one of: specific for the wireless device 130, and non-specific for the wireless device 130.

Further details of these embodiments may be found described below, e.g., for the first group of examples.

In a first group of examples of embodiments herein, Small Data transmission using pre-configured PUSCH may be configured with TA-0 and TA validation may be not required, as indicated above as option ii). The configuration may be explicit, or implicit from any other parameter or e.g., absence of the TA configuration parameter. The solution considered in 3GPP so far is to use an uplink synchronized PUSCH, such as for 4-step RACH Msg3 or in Connected mode, for which the TA may need to be evaluated in the UE before transmission when there is no Msg1 or Msg2 for Small Data pre-configured PUSCH. That is, similar to Rel-16 PUR for LTE-M and NB-IoT, and similar to the PUSCH resource used for Rel-15 'configured grant' in Connected mode. In this group of examples, a PUSCH resource with TA=0, similar to the PUSCH in MsgA for 2-step RACH, may instead be used for Small Data pre-configured PUSCH. To cope with out-of-sync uplink transmissions, optionally a longer CP, guard time and/or guard band may be configured. It may be noted that unlike for the 2-step RACH, this configuration is made UE-specific. Since TA may be considered valid in the entire cell, no TA validation in UE may be required before data transmission. TA=0 may be used, e.g., in small cells.

In some examples wherein the TA value may be configured to be zero for at least one of the transmissions, in order to compensate for lack of uplink synchronization, e.g., to support transmission from RRC inactive without TA validation before transmission, a longer CP, guard time and/or guard band may be additionally configured, e.g., in the first configuration.

In some embodiments, the first configuration may further configure the wireless device 130 to refrain from performing additional link adaptations after having performed a first link adaptation during initial connection with the network node 110. Further details of these embodiments may be found described below, e.g., for the second group of examples.

In one alternative, second, group of examples of embodiments herein of the above, link adaptation, which is not possible for 2-step RACH, may be done "once and for all" based on the link quality during the initial connection in which the wireless device 130, e.g., a UE, may be configured with Small Data pre-configured PUSCH. That is, it may be assumed that the wireless device 130 is stationary enough to have the same link adaptation, that is, use of Transport Block Size (TBS), Modulation and Coding Scheme (MCS), power control parameters, etc. may be applied for all subsequent periodic data transmission, or until an updated configuration may be provided.

In one alternative, third, group of examples of the above, the step of not performing TA validation at all may be replaced by a condition to check that the PUSCH transmission with TA=0 would still be feasible and may be pursued. This check may include for example checking that the wireless device 130 remains in the same cell, the same Synchronization Signal Block (SSB) beam, or that other radio conditions have not changed more than a configurable amount.

In another, fourth, group of examples of embodiments herein, as indicated above as option ii), for Small Data transmission using pre-configured PUSCH, it may be made configurable whether to use the 4-step RACH Msg3 like PUSCH transmission or the 2-step RACH MsgA like PUSCH transmission. That is, whether to, as part of the 'Small Data pre-configured PUSCH' configuration, configure the wireless device 130 with a specific TA value, which may need to be validated before each data transmission, much like PUR, or with TA=0, in which case no TA validation may need to be required, but optionally longer CP or guard time/band may be configured.

The other part of the Small Data pre-configured PUSCH configuration may be kept common, and it may be left to network implementation, which may be based on assistance information from the UE, whether to configure the alternative TA=0 or TA≠0. This is illustrated later, in FIG. 8.

In another, fifth, group of examples of embodiments herein, the distinction in configuration may be instead if the wireless device 130 is supposed to perform TA validation before data transmission or not. That is, the wireless device 130 may be configured with a TA during the Small Data pre-configured PUSCH configuration, e.g. the current value of the TA may be stored when the wireless device 130 is released to Inactive state. However, upon data transmission it may not be required to validate the TA and the UE may anyway apply it for the data transmission.

In agreement with the first option described above, in one method, referred to herein as a seventh group of examples, the wireless device 130 may be pre-configured to perform 2-step RACH using a first preconfigured TA, value for the PRACH preamble transmission, and a second preconfigured TA value for the PUSCH MsgA transmission.

The PRACH and PUSCH preconfigured TA values may take on the same, or different values. The PRACH TA may e.g., be set to 0, that is, no TA compensation configured, while the PUSCH TA may be configured to facilitate uplink time synchronization according to the anticipated round-trip time. The network may use the PRACH preamble to estimate the actual absolute TA value, and may use a downlink transmission to configure needed adjustments of the wireless device 130 pre-configured TA values.

By the wireless device 130 obtaining the first configuration, which is specific to the wireless device 130, configuration flexibility may be achieved, thereby optimizing periodic uplink communication in small cells, or for wireless devices being close to the network node 110.

The benefit of using TA 0 for the PRACH may be understood to be that the preamble transmission may always be received within the gNB PRACH receiver window, even if the wireless device 130 may have moved since the TA pre-configuration, and the TA value configured for the MsgA PUSCH may be outdated. This may allow the network node 110, e.g., a gNB, to always perform a TA estimate on the PRACH preamble. It may also reduce the interference from the PRACH channel to other configured channels, e.g., PUSCH, surrounding the PRACH in time and frequency.

For some wireless devices, in agreement with the second option, TA=0 may be able to be configured on a wireless device-specific basis, and in addition, the TA validation may be omitted in order to obtain power savings at the wireless device 130. Hence, configuration flexibility is achieved.

Likewise, by obtaining the first configuration, configuration flexibility may be also achieved according to the third option, in a wireless-device specific manner.

Action 602

In some embodiments, the TA value may be configured to be zero, and the wireless device 130 may, in this Action 602, refrain from validating the configured TA value equal to zero before data transmission.

Refraining may be understood as not performing, or avoiding the performance of.

Further details of these embodiments may be found described above, e.g., for the first group of examples.

By determining the wireless device 130 refraining from validating the configured TA value equal to zero in this Action 602, the wireless device 130 may be enabled to save power. This may be performed flexibly, based on the optimized configuration obtained in Action 601.

Action 603

In some embodiments, the TA value may be configured to be zero, and the wireless device 130 may, in this Action 603, determine a validity of the configured TA equal to zero before data transmission.

Determining in this Action 603 may comprise calculating, deriving, etc.

Further details of these embodiments may be found described above, e.g., for the third group of examples. That is, determining in this Action 603 may comprise checking that the PUSCH transmission with TA-0 may still be feasible and may be pursued. This check may include for example checking that the wireless device 130 remains in the same cell, the same SSB beam, or that other radio conditions have not changed more than a configurable amount.

In some embodiments, whether the wireless device 130 performs the refraining of Action 602 or the determining of Action 603 may be configurable, e.g., by the network node 110. Further details of these embodiments may be found described above, e.g., for the fourth group of examples.

By the wireless device 130 determining the validity of the configured TA equal to zero before data transmission in this Action 603, the wireless device 130 may be enabled to then flexibly adjust, if necessary, the TA in the next Action 604, or in Action 605, thereby optimizing uplink communication with the network node 110.

Action 604

Embodiments herein may also provide methods for TA correction.

In one eighth group of examples, the network, via the network node 110, may preconfigure the wireless device 130 with the permission to self-adjust its TA value in RRC idle or RRC inactive mode, that is, adjusting a configured TA value without further network feedback. The self-adjustment may be restricted to a configured absolute TA range, or to a range relative the current TA value stored in the wireless device 130.

In this Action 604, the wireless device 130 may obtain another configuration, e.g., a second configuration. The second configuration may configure the wireless device 130 to adjust the configured TA value, or another configured TA value, or another configured TA value, in the absence of feedback from the network node 110.

Obtaining in this Action 604 may comprise, retrieving or fetching from a memory, determining or calculating, and/or receiving, e.g., from the network node 110, e.g., via the first link 141, or from the another network node 111, e.g., via the second link 142.

Further details of these embodiments may be found described below, e.g., for the eighth group of examples.

By the wireless device 130 obtaining the second configuration in this Action 604, the wireless device 130 may be enabled to flexibly adjust its TA value, so that communications with the network node 110 may be synchronized, only if necessary, enabling at the same time that the wireless device 130 may, for example, refrain from validating a prior TA value it may have used. Therefore, the wireless device 130 may be enabled to save power resources and signalling resources.

Action 605

As part of the methods for TA correction according to embodiments herein, in an add-on to the above, in a sixth group of examples, the TA may be updated whenever there may be a Hybrid Automatic Repeat reQuest (HARQ) retransmission. That is, sending the Negative Acknowledgement (NACK) and UL grant for re-transmission to the UE may provide an opportunity to also provide a new TA, or a change to the existing one, to the UE. Further, Transmit Power Control (TPC) may also be provided in the HARQ feedback to update power control parameters.

In another, ninth, group of examples of embodiments herein, the UE's TA may be adjusted or updated whenever the UE may be moved to connected mode. That is, if any other procedure updates the TA, the configuration for pre-configured PUSCH Small Data may be updated with this new TA value.

In this Action 605, the wireless device 130 may update the configured TA based on at least one of: i) an occurrence of a Hybrid Automatic Repeat reQuest (HARQ) retransmission, and ii) a movement of the wireless device 130 to a connected mode or state, e.g., from the inactive or the idle state or mode; Further details of these embodiments may be found described below, e.g., for the ninth group of examples.

Further details of embodiments a) may be found described below, e.g., for the sixth group of examples.

By the wireless device 130 updating the configured TA in this Action 605, the wireless device 130 may be enabled to flexibly adjust its TA value when, and only if necessary, so that communications with the network node 110 may be synchronized while enabling at the same time that the wireless device 130 may, for example, refrain from validating a prior TA value it may have used. Therefore, the wireless device 130 may be enabled to save power resources and signalling resources while enabling, at the same time, synchronized communications with the network node 110.

Embodiments of a method, performed by the network node 110, will now be described with reference to the flowchart depicted in FIG. 7. The method may be understood to be for handling uplink communication by the wireless device 130. The network node 110 and the wireless device 130 operate in the wireless communications network 100.

In some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

Several embodiments are comprised herein. In some embodiments all the actions may be performed. In some embodiments, one or more actions may be performed. It should be noted that the examples herein may be not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the network node 110 is depicted in FIG. 7. Some actions may be performed in a different order than that shown in FIG. 7. In FIG. 7, optional actions are represented with dashed lines.

In the text below, a/the PRACH preamble may be understood or be replaced by a/the "preamble".

The detailed description of some of the following corresponds to the same references provided above, in relation to the actions described for the wireless device 130 and will thus not be repeated here to simplify the description, however, it applies equally. For example, in some embodiments, uplink communication may comprise uplink transmission of data.

In some embodiments, a size of a buffer for the uplink communication of the wireless device 130 may be smaller than a threshold. This may be understood to mean that the data comprised in the uplink communication may be "Small Data".

The data may be user plane data.

Action 701

In this Action 701, the network node 110 provides, to the wireless device 130, the configuration, e.g., the first configuration. The first configuration is of the set of periodic uplink time-frequency resources, e.g., one or more uplink time-frequency resources, for uplink communication by the wireless device 130, e.g., to the network node 110.

Providing in this Action 701 may comprise transmitting, or sending, e.g., via the first link 141.

The time-frequency resources may be, e.g., ODFM symbols.

The uplink communication may comprise data, which may be user plane data.

The first configuration is specific for the wireless device 130. The first configuration configures the set of periodic uplink time-frequency resources to support least one of: a) the first procedure comprising the first PUSCH transmission of the MsgA transmission, b) the second procedure comprising uplink transmissions of, or corresponding to, the two-step RACH procedure comprising, the first PRACH transmission, e.g., the first PRACH preamble transmission, and the second PUSCH transmission; that is, the second procedure may be said to be "two-step RACH procedure-based", and c) the third procedure comprising uplink transmissions of, or corresponding to, the four-step RACH procedure comprising the second PRACH transmission, e.g., the second PRACH preamble transmission, and the third PUSCH transmission; that is, the third procedure may be said to be "four-step RACH procedure-based".

The TA value of at least one of the first PUSCH transmission, the second PUSCH transmission, the third PUSCH transmission, the first PRACH transmission and the second PRACH transmission is at least one of the following options. According to a first option i) configurable by the network node 110 or another network node 111, independently between the PUSCH and the PRACH transmissions. According to a second option ii) configured to be zero, wherein the wireless device 130 is configured to refrain from validating the TA value; this may be, e.g., during the course of the second procedure. According to a third option, explicitly configured and validated before transmission from the inactive or idle state; this may be, e.g., from the inactive or idle state or mode.

Further details of these embodiments may be found described above, e.g., for the first group of examples.

The TA according to i, ii, and/or iii may be specified in the first configuration.

The uplink communication may be configured to be performed with the proviso that the size of the buffer of the wireless device 130 is smaller than a threshold. The buffer may be the buffer for transmission, which may be referred to herein as the transmit buffer.

In some embodiments, the set of periodic uplink time-frequency resources for uplink communication may be in one or more PUSCH uplink grants.

The set of periodic uplink time-frequency resources for uplink communication to the network node 110 may be "pre-configured PUSCH resources".

The uplink communication by the wireless device 130 may be during the inactive, or idle, state or mode of the wireless device 130. The inactive state may be, e.g., as defined in 5G or in a younger system having equivalent functionality.

In some embodiments, the first configuration may further configure the wireless device 130 with at least one of: a) the longer cyclic prefix than the currently used cyclic prefix by the wireless device 130, wherein the longer prefix may be one of: specific for the wireless device 130, and non-specific for the wireless device 130, b) the guard time, wherein the guard time may be one of: specific for the wireless device 130, and non-specific for the wireless device 130, c) the guard band, wherein the guard band may be one of: specific for the wireless device 130, and non-specific for the wireless device 130. Further details of these embodiments may be found described above, e.g., for the first group of examples. In some examples wherein the TA value may be configured to be zero for at least one of the transmissions, in order to compensate for lack of uplink synchronization, e.g., to support transmission from RRC inactive without TA validation before transmission, a longer CP, guard time and/or guard band may be additionally configured, e.g., in the first configuration.

In some embodiments, the first configuration may further configure the wireless device 130 to refrain from performing additional link adaptations after having performed the first link adaptation during initial connection with the network node 110. Further details of these embodiments may be found described above, e.g., for the second group of examples.

In some embodiments, wherein the TA value may be configured to be zero, the first configuration may further configure the wireless device 130 to refrain from validating the configured TA value equal to zero before data transmission. Further details of these embodiments may be found described above, e.g., for the first group of examples.

In some embodiments, wherein the TA value may be configured to be zero, the first configuration may further configure the wireless device 130 to determine the validity of the configured TA equal to zero before data transmission. Further details of these embodiments may be found described above, e.g., for the third group of examples.

In some embodiments, whether the wireless device 130 may performs the refraining from validating the configured TA value equal to zero before data transmission or the determining of the validity of the configured TA equal to zero before data transmission may be configurable, e.g., configurable by the network node 110. Further details of these embodiments may be found described above, e.g., for the fourth group of examples.

In some embodiments, the first configuration may further configure the wireless device 130 to update the configured TA based on at least one of: i) the occurrence of the HARQ retransmission; Further details of these embodiments may be found described above, e.g., for the sixth group of examples, and ii) the movement of the wireless device 130 to the connected mode or state, e.g., from the inactive or the idle state or mode; Further details of these embodiments may be found described below, e.g., for the ninth group of examples. Action 702

In some embodiments, the method may further comprise in this Action 702, that the network node 110 may provide the another configuration, e.g., the second configuration to the wireless device 130. The second configuration may configure the wireless device 130 to adjust the configured TA value, or another configured TA value in the absence of feedback from the network node 110.

Providing in this Action 702 may comprise transmitting, or sending, e.g., via the first link 141.

The second configuration may configure the wireless device 130 to adjust the configured TA value, or another configured TA value, e.g., in the absence of feedback from the network node 110.

Further details of these embodiments may be found described below, e.g., for the eighth group of examples.

Figure 8:
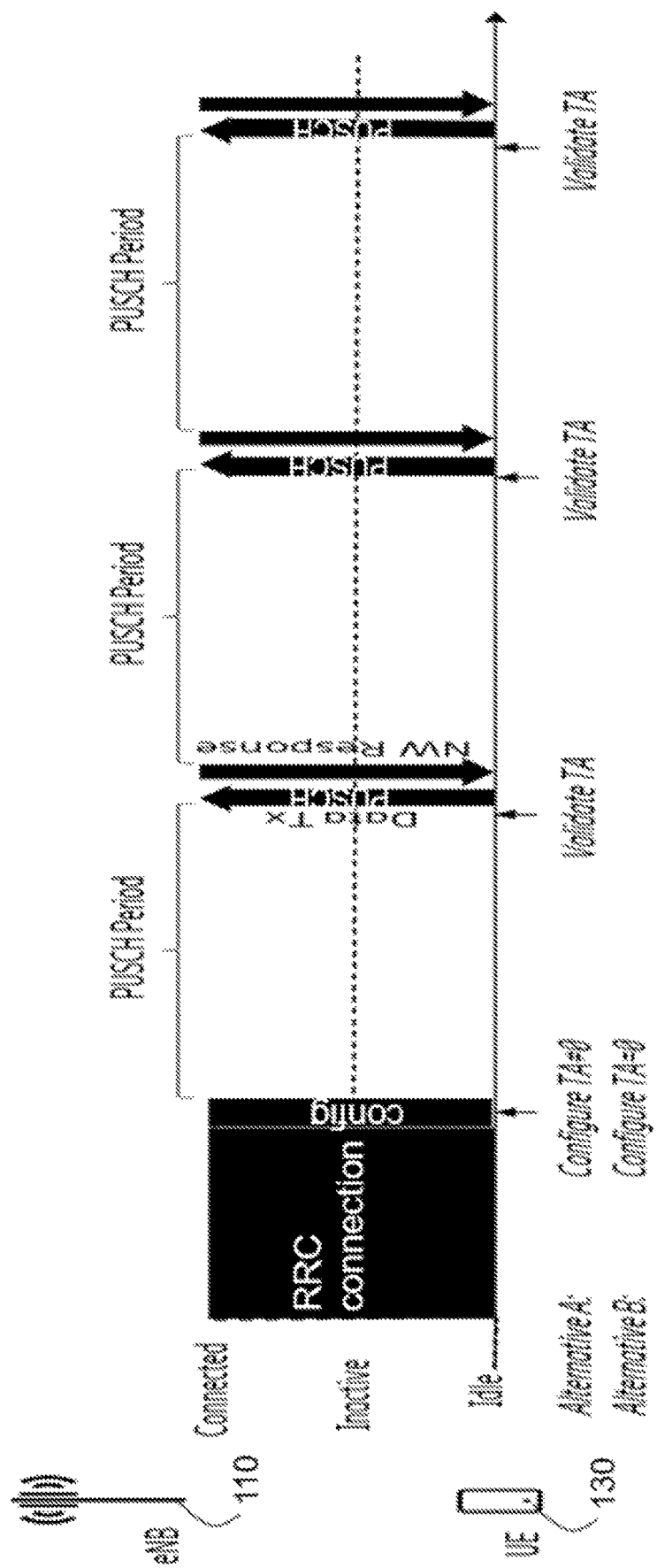
FIG. 8 is a schematic diagram illustrating non-limiting examples of the configuration alternatives, according to embodiments herein.

FIG. 8 is a schematic illustration of some of the configuration alternatives described herein. As illustrated in FIG. 8, during an RRC connection, e.g., an initial RRC connection, the wireless device 130, according to Action 601 obtains the first configuration by receiving it from the network node 110. The first configuration configures the wireless device 130 with the set of periodic uplink time-frequency resources wherein a TA value of at least one of the PUSCH transmissions is, according to the second option, alternative B in FIG. 8, configured to be zero, wherein the wireless device 130 is configured to refrain from validating the TA value, or according to the third option, alternative A in FIG. 8, explicitly configured, here, as a value other than zero, and validated before transmission from the inactive or idle state. The uplink transmissions to the network node 110 are PUSCH transmissions of data, and are performed during an inactive, or idle state. The periodicity of the transmissions may be determined by the PUSCH period. After every uplink transmission from the idle mode, the network node 110 sends a response, referred to as a "NW response" in FIG. 8.

Certain embodiments disclosed herein may provide one or more of the following technical advantage(s), which may be summarized as follows. Embodiments herein may be understood to introduce the possibility of reducing signaling even further for the configuration and/or performance of uplink communication.

Figure 9:
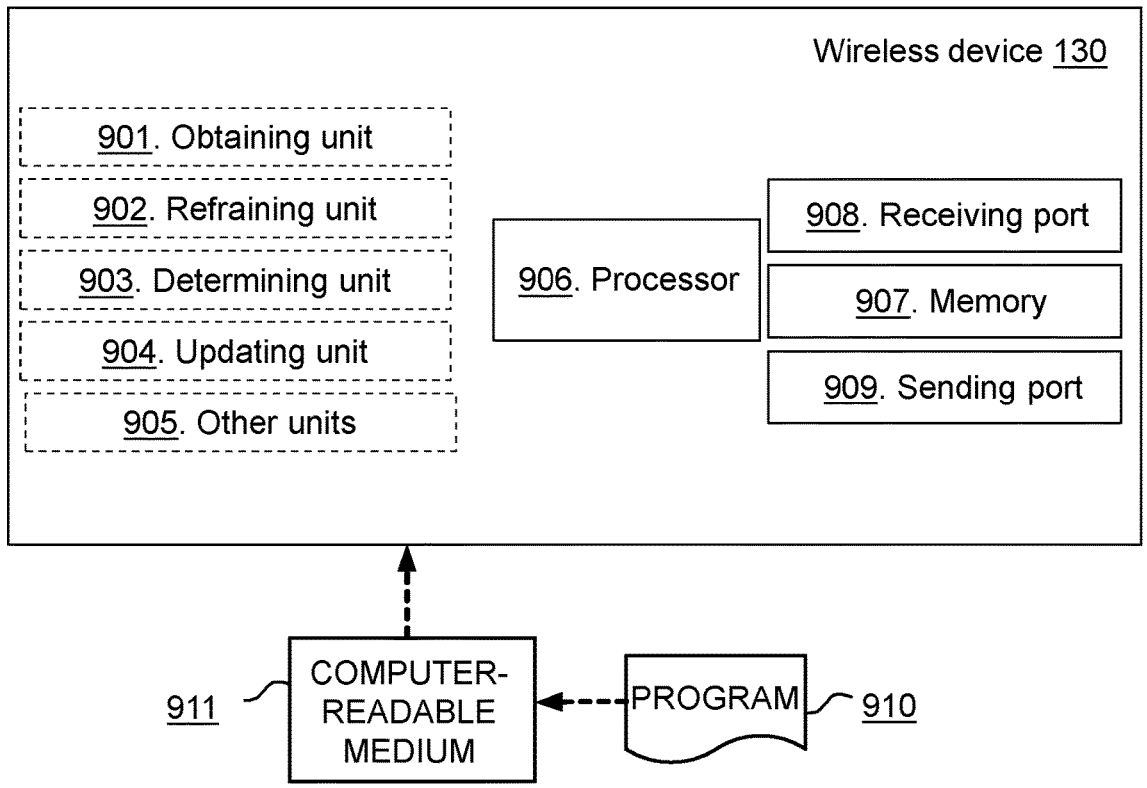
FIG. 9 is a schematic block diagram illustrating two embodiments, in panel a) and panel b), of a wireless device, according to embodiments herein.
Figure 9:
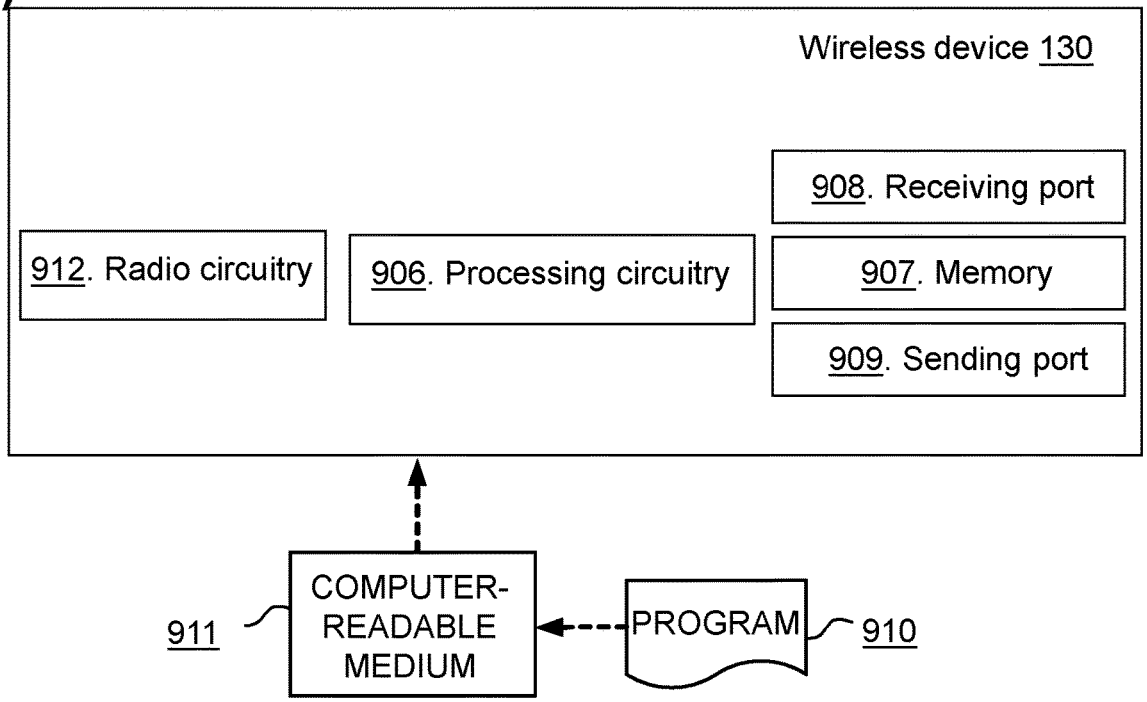

FIG. 9 depicts two different examples in panels a) and b), respectively, of the arrangement that the wireless device 130 may comprise to perform the method actions described above in relation to FIG. 6. In some embodiments, the wireless device 130 may comprise the following arrangement depicted in FIG. 9*a*. The wireless device 130 may be understood to be for handling uplink communication to the network node 110. The wireless device 130 and the network node 110 are configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the wireless device 130 and will thus not be repeated here. For example, in some embodiments, uplink communication may be configured to comprise uplink transmission of data.

In some embodiments, a size of the buffer for the uplink communication of the wireless device 130 may be configured to be smaller than the threshold. This may be understood to mean that the data comprised in the uplink communication may be configured to be "Small Data".

The data may be configured to be user plane data.

In FIG. 9, optional units are indicated with dashed boxes.

The wireless device 130 is configured to perform the obtaining of Action 601, e.g. by means of an obtaining unit 901 within the wireless device 130, configured to obtain the first configuration of the set of periodic uplink time-frequency resources for uplink communication to the network node 110. The first configuration is configured to be specific for the wireless device 130. The first configuration is configured to configure the set of periodic uplink time-frequency resources to support at least one of: a) the first procedure comprising a PUSCH transmission of a MsgA transmission, b) the second procedure comprising uplink transmissions of, or corresponding to, a two-step RACH procedure comprising, a first PRACH transmission and a second PUSCH transmission, and c) the third procedure comprising uplink transmissions of, or corresponding to, a four-step RACH procedure comprising a second PRACH transmission, and a third PUSCH transmission. The TA value of at least one of the first PUSCH transmission, the second PUSCH transmission, the third PUSCH transmission, the first PRACH transmission and the second PRACH transmission is at least one of: i) configured to be configurable by the network node 110 or another network node 111, independently between the PUSCH and the PRACH transmissions, ii) configured to be zero, wherein the wireless device 130 is configured to refrain from validating the TA value, and iii) explicitly configured and validated before transmission from the inactive or idle state.

Further details of these embodiments may be found described above, e.g., for the first group of examples.

The set of periodic uplink time-frequency resources for uplink communication may be configured to be in one or more PUSCH uplink grants.

In some embodiments, the first configuration may further configure the wireless device 130 with at least one of: a) the longer cyclic prefix than the currently used cyclic prefix by the wireless device 130, wherein the longer prefix may be configured to be one of: specific for the wireless device 130, and non-specific for the wireless device 130, b) the guard time, wherein the guard time may be configured to be one of: specific for the wireless device 130, and non-specific for the wireless device 130, and c) the guard band, wherein the guard band may be configured to be one of: specific for the wireless device 130, and non-specific for the wireless device 130.

In some embodiments, the first configuration may further configure the wireless device 130 to refrain from performing additional link adaptations after having performed the first link adaptation during the initial connection with the network node 110.

In some embodiments wherein the TA value may be configured to be zero, the wireless device 130 may be configured to perform the refraining of Action 602, e.g. by means of a refraining unit 902 within the wireless device 130, configured to refrain from validating the configured TA value equal to zero before data transmission.

In some embodiments, wherein the TA may be configured to be zero, the wireless device 130 may be further configured to perform the determining of Action 603, e.g. by means of a determining unit 903 within the wireless device 130, configured to determine the validity of the configured TA equal to zero before data transmission.

In some embodiments, whether the wireless device 130 performs the refraining or the determining may be configured to be configurable.

In some embodiments, the wireless device 130 may be further configured to perform the updating of Action 605, e.g. by means of an updating unit 904 within the wireless device 130, configured to update the configured TA based on at least one of: i) the occurrence of a HARQ retransmission, and ii) the movement of the wireless device 130 to the connected mode.

The wireless device 130 may be further configured to perform the obtaining of Action 604, e.g. by means of the obtaining unit 901, configured to obtain the second configuration. The second configuration may be configured to configure the wireless device 130 to adjust the configured TA value, or another configured TA value in the absence of feedback from the network node 110.

Other units 905 may be comprised in the wireless device 130.

The embodiments herein in the wireless device 130 may be implemented through one or more processors, such as a processor 906 in the wireless device 130 depicted in FIG. 9a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 907 comprising one or more memory units. The memory 907 is arranged to be used to store obtained information, store data, configurations, schedulings, and applications etc. to perform the methods herein when being executed in the wireless device 130.

In some embodiments, the wireless device 130 may receive information from, e.g., the network node 110 and/or the another network node 111, through a receiving port 908. In some embodiments, the receiving port 908 may be, for example, connected to one or more antennas in wireless device 130. In other embodiments, the wireless device 130 may receive information from another structure in the wireless communications network 100 through the receiving port 908. Since the receiving port 908 may be in communication with the processor 906, the receiving port 908 may then send the received information to the processor 906. The receiving port 908 may also be configured to receive other information.

The processor 906 in the wireless device 130 may be further configured to transmit or send information to e.g., the network node 110, or another structure in the wireless communications network 100, through a sending port 909, which may be in communication with the processor 906, and the memory 907.

Those skilled in the art will also appreciate that the different units 901-905 described above may refer to a combination of analog and digital modules, and/or one or more processors configured with software and/or firmware, e.g., stored in memory, that, when executed by the one or more processors such as the processor 906, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 901-905 described above may be implemented as one or more applications running on one or more processors such as the processor 906.

Thus, the methods according to the embodiments described herein for the wireless device 130 may be respectively implemented by means of a computer program 910 product, comprising instructions, i.e., software code portions, which, when executed on at least one processor 906, cause the at least one processor 906 to carry out the actions described herein, as performed by the wireless device 130. The computer program 910 product may be stored on a computer-readable storage medium 911. The computer-readable storage medium 911, having stored thereon the computer program 910, may comprise instructions which, when executed on at least one processor 906, cause the at least one processor 906 to carry out the actions described herein, as performed by the wireless device 130. In some embodiments, the computer-readable storage medium 911 may be a non-transitory computer-readable storage medium, such as a CD ROM disc, or a memory stick. In other embodiments, the computer program 910 product may be stored on a carrier containing the computer program 910 just described, wherein the carrier is one of an electronic signal, optical signal, radio signal, or the computer-readable storage medium 911, as described above.

The wireless device 130 may comprise a communication interface configured to facilitate communications between the wireless device 130 and other nodes or devices, e.g., the network node 110 and/or the another network node 111. The interface may, for example, include a transceiver configured to transmit and receive radio signals over an air interface in accordance with a suitable standard.

In other embodiments, the wireless device 130 may comprise the following arrangement depicted in FIG. 9b. The wireless device 130 may comprise a processing circuitry 906, e.g., one or more processors such as the processor 906, in the wireless device 130 and the memory 907. The wireless device 130 may also comprise a radio circuitry 912, which may comprise e.g., the receiving port 908 and the sending port 909. The processing circuitry 912 may be configured to, or operable to, perform the method actions according to FIG. 6, FIG. 8 and/or FIGS. 12-16, in a similar manner as that described in relation to FIG. 9a. The radio circuitry 912 may be configured to set up and maintain at least a wireless connection with the network node 110 and/or the another network node 111. Circuitry may be understood herein as a hardware component.

Figure 6:
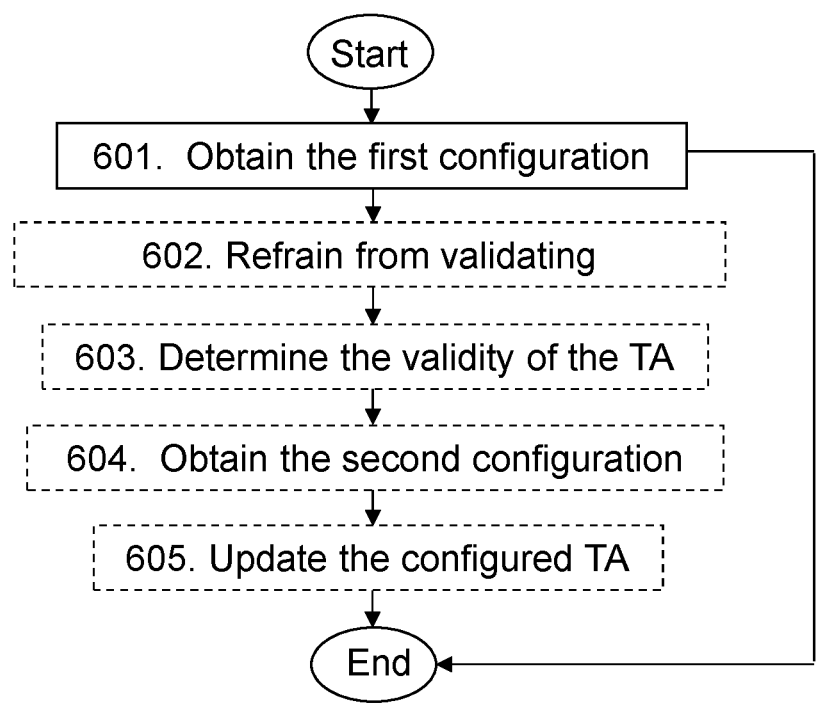
FIG. 6 is a flowchart depicting a method in a wireless device, according to embodiments herein.

Hence, embodiments herein also relate to the wireless device 130 comprising the processing circuitry 906 and the memory 907, said memory 907 containing instructions executable by said processing circuitry 906, whereby the wireless device 130 is operative to perform the actions described herein in relation to the wireless device 130, e.g., in FIG. 6, FIG. 8 and/or FIGS. 12-16.

Figure 10:
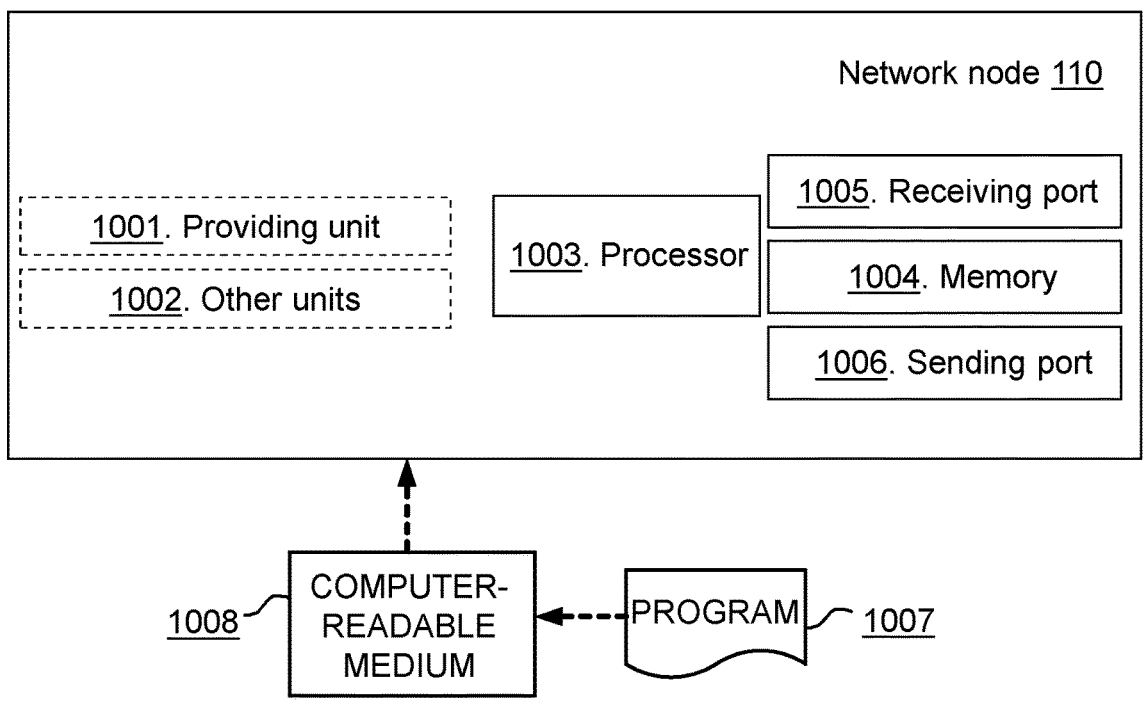
FIG. 10 is a schematic block diagram illustrating two embodiments, in panel a) and panel b), of a network node, according to embodiments herein.
Figure 10:
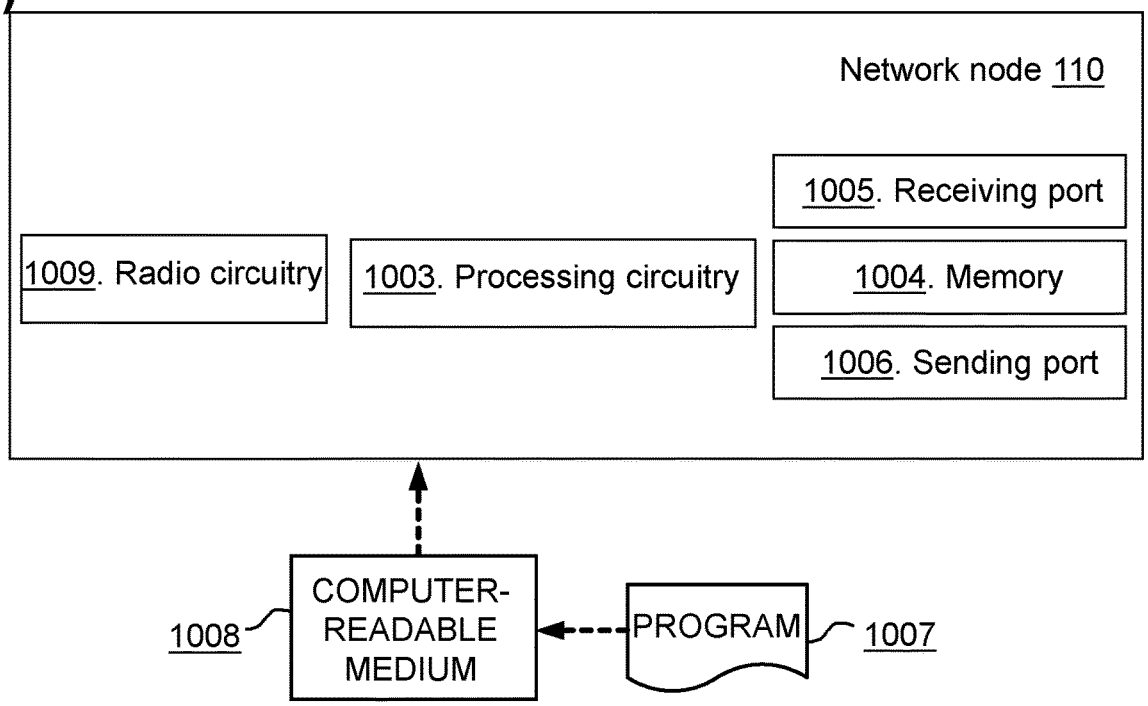

FIG. 10 depicts two different examples in panels a) and b), respectively, of the arrangement that the network node 110 may comprise to perform the method actions described above in relation to FIG. 7. In some embodiments, the network node 110 may comprise the following arrangement depicted in FIG. 10a. The network node 110 may be understood to be for handling uplink communication by the wireless device 130. The network node 110 and the wireless device 130 are configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the wireless device 130, and will thus not be repeated here. For example, in some embodiments, uplink communication may be configured to comprise uplink transmission of data.

In some embodiments, the size of the buffer for the uplink communication of the wireless device 130 may be configured to be smaller than the threshold. This may be understood to mean that the data comprised in the uplink communication may be configured to be "Small Data".

The data may be configured to be user plane data.

In FIG. 10, optional units are indicated with dashed boxes.

The network node 110 is configured to perform the providing of Action 701, e.g. by means of a providing unit 1001 within the network node 110, configured to provide, to the wireless device 130, the first configuration of the set of periodic uplink time-frequency resources for uplink communication by the wireless device 130. The first configuration is configured to be specific for the wireless device 130. The first configuration is configured to configure the set of periodic uplink time-frequency resources to support at least one of: a) the first procedure comprising the first PUSCH transmission of the MsgA transmission, b) the second procedure comprising uplink transmissions of, or corresponding to, the two-step RACH procedure comprising, the first PRACH transmission, and the second PUSCH transmission, and c) the third procedure comprising uplink transmissions of, or corresponding to, the four-step RACH procedure comprising the second PRACH transmission, and the third PUSCH transmission. The TA value of at least one of the first PUSCH transmission, the second PUSCH transmission, the third PUSCH transmission, the first PRACH transmission and the second PRACH transmission is configured to be at least one of: i) configured to be configurable by the network node 110 or another network node 111, independently between the PUSCH and the PRACH transmissions, ii) configured to be zero, wherein the wireless device 130 is configured to refrain from validating the TA value, and c) explicitly configured and validated before transmission from the inactive or idle state.

The set of periodic uplink time-frequency resources for uplink communication may be configured to be in one or more PUSCH uplink grants.

In some embodiments, the first configuration may further configure the wireless device 130 with at least one of: a) the longer cyclic prefix than the currently used cyclic prefix by the wireless device 130, wherein the longer prefix may be configured to be one of: specific for the wireless device 130, and non-specific for the wireless device 130, b) the guard time, wherein the guard time may be configured to be one of: specific for the wireless device 130, and non-specific for the wireless device 130, and c) the guard band, wherein the guard band may be configured to be one of: specific for the wireless device 130, and non-specific for the wireless device 130.

In some embodiments, the first configuration may be further configured to configure the wireless device 130 to refrain from performing additional link adaptations after having performed the first link adaptation during the initial connection with the network node 110.

In some embodiments wherein the TA value may be configured to be zero, first configuration may be further configured to configure the wireless device 130 to refrain from validating the configured TA value equal to zero before data transmission.

In some embodiments, wherein the TA may be configured to be zero, the first configuration may be further configured to configure the wireless device 130 to determine the validity of the configured TA equal to zero before data transmission.

In some embodiments, whether the wireless device 130 performs the refraining from validating the configured TA value equal to zero before data transmission or the determining of the validity of the configured TA equal to zero before data transmission may be configured to be configurable.

In some embodiments, the first configuration may be further configured to configure the wireless device 130 to update the configured TA based on at least one of: i) the occurrence of a HARQ retransmission, and ii) the movement of the wireless device 130 to the connected mode.

The network node 110 may be configured to perform the providing of Action 702, e.g. by means of the providing unit 1001, configured to provide the second configuration to the wireless device 130. The second configuration may be configured to configure the wireless device 130 to adjust the configured TA value, or another configured TA value in the absence of feedback from the network node 110.

Other units 1003 may be comprised in the network node 110.

The embodiments herein in the network node 110 may be implemented through one or more processors, such as a processor 1003 in the network node 110 depicted in FIG. 10a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1004 comprising one or more memory units. The memory 1004 is arranged to be used to store obtained information, store data, configurations, schedulings, and applications etc. to perform the methods herein when being executed in the network node 110.

In some embodiments, the network node 110 may receive information from, e.g., the wireless device 130 and/or the another network node 111, through a receiving port 1005. In some embodiments, the receiving port 1005 may be, for example, connected to one or more antennas in network node 110. In other embodiments, the network node 110 may receive information from another structure in the wireless communications network 100 through the receiving port 1005. Since the receiving port 1005 may be in communication with the processor 1003, the receiving port 1005 may then send the received information to the processor 1003. The receiving port 1005 may also be configured to receive other information.

The processor 1003 in the network node 110 may be further configured to transmit or send information to e.g., the wireless device 130, the another network node 111, or another structure in the wireless communications network 100, through a sending port 1006, which may be in communication with the processor 1003, and the memory 1004.

Those skilled in the art will also appreciate that the different units 1001-1002 described above may refer to a combination of analog and digital modules, and/or one or more processors configured with software and/or firmware, e.g., stored in memory, that, when executed by the one or more processors such as the processor 1003, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1001-1002 described above may be implemented as one or more applications running on one or more processors such as the processor 1003.

Thus, the methods according to the embodiments described herein for the network node 110 may be respectively implemented by means of a computer program 1007 product, comprising instructions, i.e., software code portions, which, when executed on at least one processor 1003, cause the at least one processor 1003 to carry out the actions described herein, as performed by the network node 110. The computer program 1007 product may be stored on a computer-readable storage medium 1008. The computer-readable storage medium 1008, having stored thereon the computer program 1007, may comprise instructions which, when executed on at least one processor 1003, cause the at least one processor 1003 to carry out the actions described herein, as performed by the network node 110. In some embodiments, the computer-readable storage medium 1008 may be a non-transitory computer-readable storage medium, such as a CD ROM disc, or a memory stick. In other embodiments, the computer program 1007 product may be stored on a carrier containing the computer program 1007 just described, wherein the carrier is one of an electronic signal, optical signal, radio signal, or the computer-readable storage medium 1008, as described above.

The network node 110 may comprise a communication interface configured to facilitate communications between the network node 110 and other nodes or devices, e.g., the wireless device 130 and/or the another network node 111. The interface may, for example, include a transceiver configured to transmit and receive radio signals over an air interface in accordance with a suitable standard.

In other embodiments, the network node 110 may comprise the following arrangement depicted in FIG. 10b. The network node 110 may comprise a processing circuitry 1003, e.g., one or more processors such as the processor 1003, in the network node 110 and the memory 1004. The network node 110 may also comprise a radio circuitry 1009, which may comprise e.g., the receiving port 1005 and the sending port 1006. The processing circuitry 1003 may be configured to, or operable to, perform the method actions according to FIG. 7, FIG. 8 and/or FIGS. 12-16, in a similar manner as that described in relation to FIG. 10a. The radio circuitry 1009 may be configured to set up and maintain at least a wireless connection with the wireless device 130 and/or the another network node 111. Circuitry may be understood herein as a hardware component.

Figure 7:
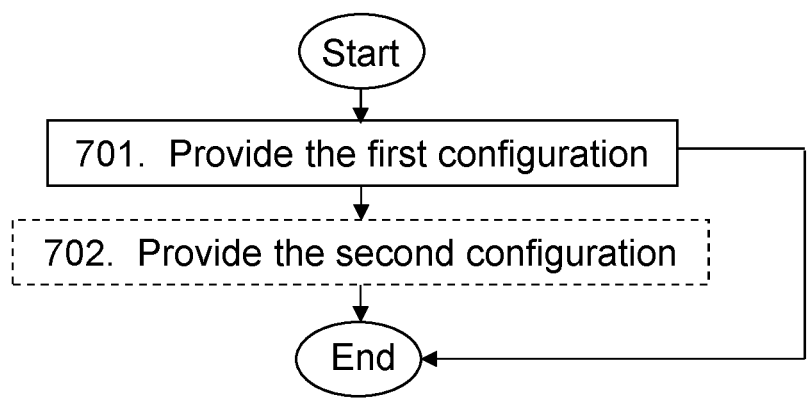
FIG. 7 is a flowchart depicting a method in a network node, according to embodiments herein.

Hence, embodiments herein also relate to the network node 110 comprising the processing circuitry 1003 and the memory 1004, said memory 1004 containing instructions executable by said processing circuitry 1003, whereby the network node 110 is operative to perform the actions described herein in relation to the network node 110, e.g., in FIG. 7, FIG. 8 and/or FIGS. 12-16.

Embodiments herein may be related to 3GPP, M2M, MTC, Small Data Enhancements, PUR, EDT, 2-step RACH, and/or preconfigured PUSCH.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

EXAMPLES RELATED TO EMBODIMENTS HEREIN

The wireless device 130 examples relate to FIG. 5, FIGS. 6, FIG. 8, FIG. 9 and FIGS. 11-16.

A method, performed by a wireless device, such as the wireless device 130 is described herein. The method may be understood to be for handling uplink communication to a network node, such as the network node 110. The wireless device 130 and the network node 110 may be operating in a wireless communications network, such as the wireless communications network 100.

Uplink communication may comprise uplink transmission of data.

In some examples, a size of a buffer of the wireless device 130 for the uplink communication may be smaller than a threshold. This may be understood to mean that the data comprised in the uplink communication may be "Small Data".

The data may be user plane data.

The method may comprise one or more of the following actions.

Several examples are comprised herein. In some examples all the actions may be performed. In some examples, one or more actions may be performed. It should be noted that the examples herein may be not mutually exclusive. One or more examples may be combined, where applicable. All possible combinations are not described to simplify the description. Components from one example may be tacitly assumed to be present in another example and it will be obvious to a person skilled in the art how those components may be used in the other exemplary examples. A non-limiting example of the method performed by the wireless device 130 is depicted in FIG. 6. Some actions may be performed in a different order than that shown in FIG. 6. In FIG. 6, optional actions are represented with dashed lines.

In the text below, a/the PRACH preamble may be understood or be replaced by a/the "preamble".

Obtaining 601 a configuration, e.g., a first configuration. The wireless device 130 may be configured to perform this obtaining action 601, e.g. by means of an obtaining unit 901 within the wireless device 130, configured to perform this action.

Obtaining in this Action 601 may comprise, retrieving or fetching from a memory, determining or calculating, and/or receiving, e.g., from the network node 110, e.g., via the first link 141, or from the another network node 111, e.g., via the second link 142.

The first configuration may be of a set of periodic uplink time-frequency resources, e.g., one or more uplink time-frequency resources, for uplink communication to the network node 110.

The set of periodic uplink time-frequency resources for uplink communication to the network node 110 may be "pre-configured PUSCH resources".

The uplink communication to the network node 110 may be during an inactive, or idle, state or mode of the wireless device 130. The inactive state may be, e.g., as defined in 5G or in a younger system having equivalent functionality.

The time-frequency resources may be, e.g., ODFM symbols.

The uplink communication may comprise data, which may be user plane data.

The first configuration may configure the set of periodic uplink time-frequency resources to support least one of:
  a) a first procedure; the first procedure may comprise a first PUSCH transmission of an MsgA transmission,
  b) a second procedure; the second procedure may comprise uplink transmissions of, or corresponding to, a two-step RACH procedure comprising, a first PRACH transmission, e.g., a first PRACH preamble transmission, and a second PUSCH transmission; that is, the second procedure may be said to be "two-step RACH procedure-based", and
  c) a third procedure; the third procedure may comprise uplink transmissions of, or corresponding to, a four-step RACH procedure comprising a second PRACH transmission, e.g., a second PRACH preamble transmission, and a third PUSCH transmission; that is, the third procedure may be said to be "four-step RACH procedure-based".

A Timing Advance (TA) value of at least one of the first PUSCH transmission, the second PUSCH transmission, the third PUSCH transmission, the first PRACH transmission and the second PRACH transmission may be at least one of:
  i. configurable by the network node 110 or another network node 111, independently between the PUSCH and the PRACH transmissions,
  ii. configured to be zero, wherein the wireless device 130 may configured to refrain from validating the TA value; this may be, e.g., during the course of the second procedure, and
  iii. explicitly configured and validated before transmission; this may be, e.g., from the inactive or idle state or mode.

The TA according to i, ii, and/or iii may be specified in the first configuration.

The uplink communication may be configured to be performed with the proviso that a size of a buffer of the wireless device 130 is smaller than a threshold. The buffer may be a buffer for transmission, which may be referred to herein as a transmit buffer.

In some examples, the set of periodic uplink time-frequency resources for uplink communication may be in one or more Physical Uplink Shared Channel (PUSCH) uplink grants.

The first configuration may further configure the wireless device 130 with at least one of:
  a longer cyclic prefix (CP) than a currently used cyclic prefix by the wireless device 130, wherein the longer prefix may be one of: specific for the wireless device 130, and non-specific for the wireless device 130,
  a guard time, wherein the guard time may be one of: specific for the wireless device 130, and non-specific for the wireless device 130,
  a guard band, wherein the guard band may be one of: specific for the wireless device 130, and non-specific for the wireless device 130.

Further details of these examples may be found described below, e.g., for the first group of examples. In some examples wherein the TA value maybe configured to be zero for at least one of the transmissions, in order to compensate for lack of uplink synchronization, e.g., to support transmission from RRC inactive without TA validation before transmission, a longer CP, guard time and/or guard band may be additionally configured, e.g., in the first configuration.

In some examples, the first configuration may be specific for the wireless device 130. Further details of these examples may be found described below, e.g., for the first group of examples.

In some examples, the first configuration may further configure the wireless device 130 to refrain from performing additional link adaptations after having performed a first link adaptation during initial connection with the network node 110. Further details of these examples may be found described below, e.g., for the second group of examples.

In some examples, the method may further comprise one or more of the following actions:

Refraining 602 from validating the configured TA value equal to zero, e.g., before data transmission. The wireless device 130 may be configured to perform this refraining action 602, e.g. by means of a refraining unit 902 within the wireless device 130, configured to perform this action.

This Action 602 may be performed in examples wherein the TA value may be configured to be zero.

Refraining may be understood as not performing, or avoiding the performance of.

Further details of these examples may be found described below, e.g., for the first group of examples.

Determining 603 a validity of the configured TA equal to zero, e.g., before data transmission. The wireless device 130 may be configured to perform this determining action 603, e.g. by means of a determining unit 903 within the wireless device 130, configured to perform this action.

Determining in this Action 603 may comprise calculating, deriving, etc.

This Action 603 may be performed in examples wherein the TA value may be configured to be zero.

Further details of these examples may be found described below, e.g., for the third group of examples.

In some examples, whether the wireless device 130 performs the refraining 602 or the determining 603 may be configurable, e.g., by the network node 110. Further details of these examples may be found described below, e.g., for the fourth group of examples.

Updating 605 the configured TA. The wireless device 130 may be configured to perform this updating action 605, e.g. by means of an updating unit 904 within the wireless device 130, configured to perform this action.

The updating of the configured TA may be based on at least one of:
  i. an occurrence of a Hybrid Automatic Repeat reQuest (HARQ) retransmission; Further details of these examples may be found described below, e.g., for the sixth group of examples;
  ii. a movement of the wireless device 130 to a connected mode or state, e.g., from the inactive or the idle state or mode; Further details of these examples may be found described below, e.g., for the ninth group of examples.

Obtaining 604 another configuration, e.g., a second configuration. The wireless device 130 may be configured to perform this obtaining action 604, e.g. by means of the obtaining unit 901, configured to perform this action.

Obtaining in this Action 604 may comprise, retrieving or fetching from a memory, determining or calculating, and/or receiving, e.g., from the network node 110, e.g., via the first link 141, or from the another network node 111, e.g., via the second link 142.

The second configuration may configure the wireless device 130 to adjust the configured TA value, or another configured TA value, e.g., in the absence of feedback from the network node 110.

Further details of these examples may be found described below, e.g., for the eighth group of examples.

In some examples, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

Other units 905 may be comprised in the wireless device 130.

Selected Examples Related to Embodiments Herein:

Example 1. A method performed by a wireless device (130), the method being for handling uplink communication to a network node (110), the wireless device (130) and the network node (110) operating in a wireless communications network (100), the method comprising:
  obtaining (601) a first configuration of a set of periodic uplink time-frequency resources, e.g., one or more uplink time-frequency resources, for uplink communication to the network node (110), wherein the first configuration configures the set of periodic uplink time-frequency resources to support least one of:
    a. a first procedure comprising a first PUSCH transmission of an MsgA transmission,
    b. a second procedure comprising uplink transmissions of, or corresponding to, a two-step RACH procedure comprising, a first PRACH transmission, e.g., a first PRACH preamble transmission, and a second PUSCH transmission, and
    c. a third procedure comprising uplink transmissions of, or corresponding to, a four-step RACH procedure comprising a second PRACH transmission, e.g., a second PRACH preamble transmission, and a third PUSCH transmission,
  wherein a Timing Advance, TA, value of at least one of the first PUSCH transmission, the second PUSCH transmission, the third PUSCH transmission, the first PRACH transmission and the second PRACH transmission is at least one of:
    i. configurable by the network node (110) or another network node (111), independently between the PUSCH and the PRACH transmissions,
    ii. configured to be zero, wherein the wireless device (130) is configured to refrain from validating the TA value, and
    iii. explicitly configured and validated before transmission from the inactive or idle state.

Example 2. The method according to example 1, wherein the set of periodic uplink time-frequency resources for uplink communication are in one or more Physical Uplink Shared Channel, PUSCH uplink grants.

Example 3. The method according to any of examples 1-2, wherein a size of a buffer for the uplink communication of the wireless device (130) is smaller than a threshold, Example 4. The method according to any of examples 1-3, wherein the first configuration further configures the wireless device (130) with at least one of:
  a longer cyclic prefix than a currently used cyclic prefix by the wireless device (130), wherein the longer prefix is one of: specific for the wireless device (130), and non-specific for the wireless device (130),
  a guard time, wherein the guard time is one of: specific for the wireless device (130), and non-specific for the wireless device (130),
  a guard band, wherein the guard band is one of: specific for the wireless device (130), and non-specific for the wireless device (130).

Example 5. The method according to any of examples 1-4, wherein the first configuration is specific for the wireless device (130).

Example 6. The method according to any of examples 1-5, wherein the first configuration further configures the wireless device (130) to refrain from performing additional link adaptations after having performed a first link adaptation during initial connection with the network node (110).

Example 7. The method according to any of examples 1-6, wherein the TA value is configured to be zero, and wherein the method further comprises:
  refraining (602) from validating the configured TA value equal to zero before data transmission.

Example 8. The method according to any of examples 1-6, wherein the TA value is configured to be zero, and wherein the method further comprises:
  determining (603) a validity of the configured TA equal to zero before data transmission.

Example 9. The method according to any of examples 7 and 8, wherein whether the wireless device (130) performs the refraining (602) or the determining (603) is configurable.

Example 10. The method according to any of examples 1-5 or 8-9, wherein the method further comprises:
  updating (605) the configured TA based on at least one of:
    i. an occurrence of a HARQ retransmission,
    ii. a movement of the wireless device (130) to a connected mode.

Example 11. The method according to any of examples 1-10, wherein the method further comprises:
  obtaining (604) a second configuration, the second configuration configuring the wireless device (130) to adjust the configured TA value, or another configured TA value in the absence of feedback from the network node (110).

Example 12. A method performed by a network node (110), the method being for handling uplink communication by a wireless device (130), the network node (110) and the wireless device (130) operating in a wireless communications network (100), the method comprising:
  providing (701), to the wireless device (130), a first configuration of set of periodic uplink time-frequency resources for uplink communication by the wireless device (130), wherein the first configuration configures the set of periodic uplink time-frequency resources to support least one of:
    a. a first procedure comprising a first PUSCH transmission of an MsgA transmission,
    b. a second procedure comprising uplink transmissions of, or corresponding to, a two-step RACH procedure comprising, a first PRACH transmission, e.g., a first PRACH preamble transmission, and a second PUSCH transmission, and
    c. a third procedure comprising uplink transmissions of, or corresponding to, a four-step RACH procedure comprising a second PRACH transmission, e.g., a second PRACH preamble transmission, and a third PUSCH transmission,
  wherein a Timing Advance, TA, value of at least one of the first PUSCH transmission, the second PUSCH transmission, the third PUSCH transmission, the first PRACH transmission and the second PRACH transmission is at least one of:
    i. configurable by the network node (110) or another network node (111), independently between the PUSCH and the PRACH transmissions,
    ii. configured to be zero, wherein the wireless device (130) is configured to refrain from validating the TA value, and
    iii. explicitly configured and validated before transmission from the inactive or idle state.

Example 13. The method according to example 12, wherein the set of periodic uplink time-frequency resources for uplink communication are in one or more Physical Uplink Shared Channel, PUSCH uplink grants.

Example 14. The method according to any of examples 12-13, wherein a size of a buffer for the uplink communication of the wireless device (130) is smaller than a threshold, Example 15. The method according to any of examples 12-14, wherein the first configuration further configures the wireless device (130) with at least one of:
  a longer cyclic prefix than a currently used cyclic prefix by the wireless device (130), wherein the longer prefix is one of: specific for the wireless device (130), and non-specific for the wireless device (130),
  a guard time, wherein the guard time is one of: specific for the wireless device (130), and non-specific for the wireless device (130),
  a guard band, wherein the guard band is one of: specific for the wireless device (130), and non-specific for the wireless device (130).

Example 16. The method according to any of examples 12-15, wherein the first configuration is specific for the wireless device (130).

Example 17. The method according to any of examples 12-16, wherein the first configuration further configures the wireless device (130) to refrain from performing additional link adaptations after having performed a first link adaptation during initial connection with the network node (110).

Example 18. The method according to any of examples 12-17, wherein the TA value is configured to be zero, and wherein the first configuration further configures the wireless device (130) to refrain from validating the configured TA value equal to zero before data transmission.

Example 19. The method according to any of examples 12-18, wherein the TA value is configured to be zero, and wherein the first configuration further configures the wireless device (130) to determine a validity of the configured TA equal to zero before data transmission.

Example 20. The method according to any of examples 18 and 19, wherein whether the wireless device (130) performs the refraining from validating the configured TA value equal to zero before data transmission or the determining of the validity of the configured TA equal to zero before data transmission is configurable.

Example 21. The method according to any of examples 12-16 or 19-20, wherein the first configuration further configures the wireless device (130) to update the configured TA based on at least one of:
  i. an occurrence of a HARQ retransmission,
  ii. a movement of the wireless device (130) to a connected mode.

Example 22. The method according to any of examples 12-21, wherein the method further comprises:
  providing (702) a second configuration to the wireless device (130), the second configuration configuring the wireless device (130) to adjust the configured TA value, or another configured TA value in the absence of feedback from the network node (110).

Further Extensions And Variations

Figure 11:
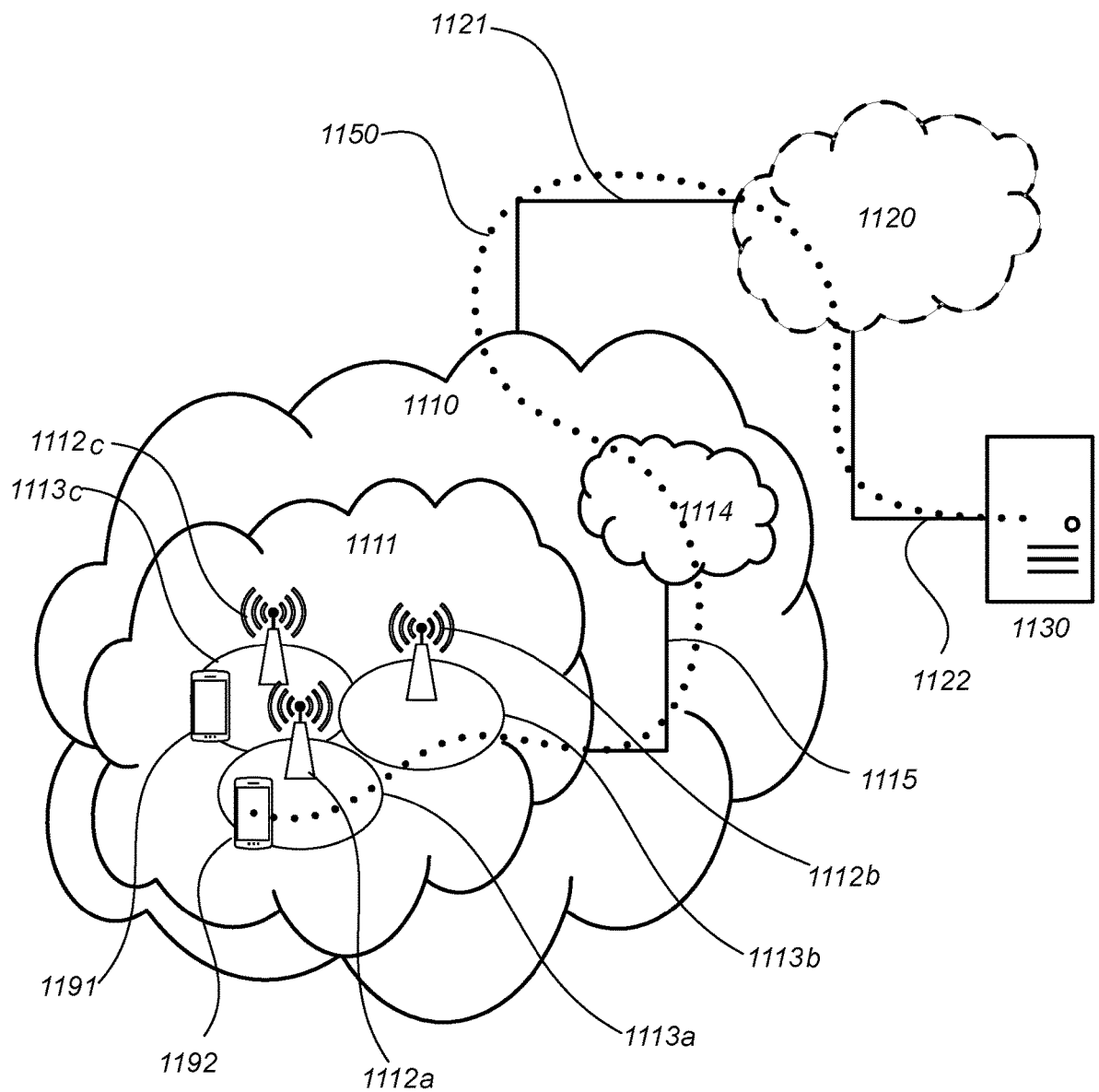
FIG. 11 is a schematic block diagram illustrating a telecommunication network connected via an intermediate network to a host computer, according to embodiments herein.

FIG. 11: Telecommunication Network Connected Via an Intermediate Network to a Host Computer in Accordance with Some Embodiments With reference to FIG. 11, in accordance with an embodiment, a communication system includes telecommunication network 1110 such as the wireless communications network 100, for example, a 3GPP-type cellular network, which comprises access network 1111, such as a radio access network, and core network 1114. Access network 1111 comprises a plurality of network nodes such as the network node 110 and/or the another network node 111. For example, base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A plurality of user equipments, such as the wireless device 130 are comprised in the wireless communications network 100. In FIG. 11, a first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112. Any of the UEs 1191, 1192 are examples of the wireless device 130.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

In relation to FIGS. 12, 13, 14, 15, and 16, which are described next, it may be understood that a UE is an example of the wireless device 130, and that any description provided for the UE equally applies to the wireless device 130. It may be also understood that the base station is an example of the network node 110 and/or the another network node 111, and that any description provided for the base station equally applies to the network node 110 and/or the another network node 111.

The wireless device 130 embodiments relate to FIG. 5, FIGS. 6, FIG. 8, FIG. 9 and FIGS. 11-16.

The wireless device 130 may comprise an interface unit to facilitate communications between the wireless device 130 and other nodes or devices, e.g., the network node 110, the host computer 1210, or any of the other nodes. In some particular examples, the interface may, for example, include a transceiver configured to transmit and receive radio signals over an air interface in accordance with a suitable standard.

The wireless device 130 may also be configured to communicate user data with a host application unit in a host computer 1210, e.g., via another link such as 1260.

Figure 12:
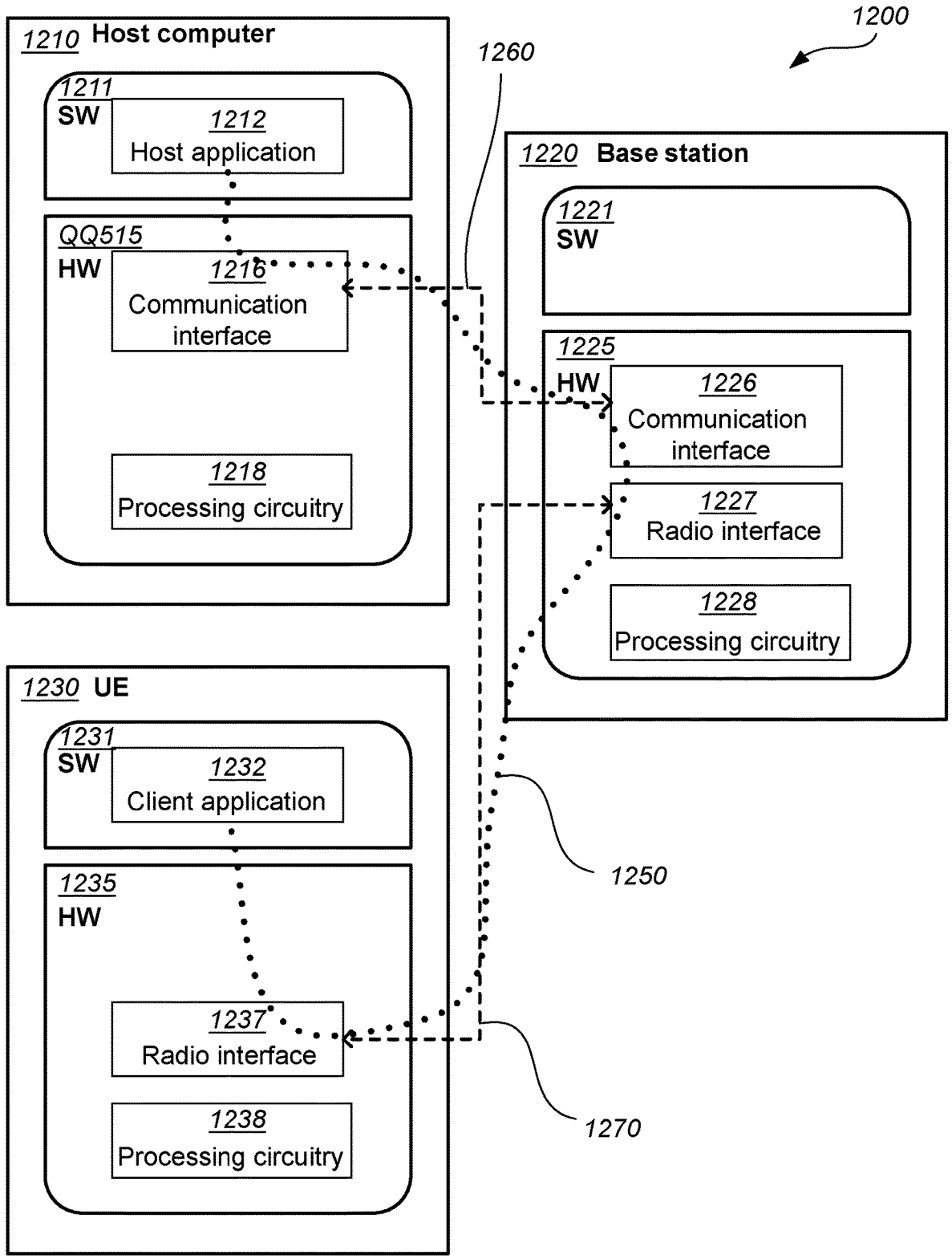
FIG. 12 is a generalized block diagram of a host computer communicating via a base station with a user equipment over a partially wireless connection, according to embodiments herein.

The wireless device 130 may comprise an arrangement as shown in FIG. 9 or in FIG. 12.

The network node 110 embodiments relate to FIG. 7, FIG. 8, FIG. 10 and FIGS. 11-16.

The network node 110 may comprise an interface unit to facilitate communications between the network node 110 and other nodes or devices, e.g., the wireless device 130, the host computer 1210, or any of the other nodes. In some particular examples, the interface may, for example, include a transceiver configured to transmit and receive radio signals over an air interface in accordance with a suitable standard.

The network node 110 may also be configured to communicate user data with a host application unit in a host computer 1210, e.g., via another link such as 1260.

The network node 110 may comprise an arrangement as shown in FIG. 10 or in FIG. 12.

FIG. 12: Host Computer Communicating Via a Base Station with a User Equipment Over a Partially Wireless Connection in Accordance with Some Embodiments Example implementations, in accordance with an embodiment, of the wireless device 130, e.g., a UE, the network node 110, e.g., a base station and host computer discussed in the preceding paragraphs will now be described with reference to FIG. 12. In communication system 1200, such as the wireless communications network 100, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes the network node 110 and/or the another network node 111, exemplified in FIG. 12 as a base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with the wireless device 130, exemplified in FIG. 12 as a UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

FIG. 13: Methods Implemented in a Communication System Including a Host Computer, a Base Station and a User Equipment in Accordance with Some Embodiments FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application.

In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 14: Methods Implemented in a Communication System Including a Host Computer, a Base Station and a User Equipment in Accordance with Some Embodiments FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

FIG. 15: Methods implemented in a communication system including a host computer, a base Station and a user equipment in accordance with some embodiments FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 16: Methods implemented in a communication system including a host computer, a base Station and a user equipment in accordance with some embodiments FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FURTHER NUMBERED EMBODIMENTS

1. A base station configured to communicate with a user equipment (UE), the base station comprising a radio interface and processing circuitry configured to perform one or more of the actions described herein as performed by the network node 110.
5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by the network node 110.
6. The communication system of embodiment 5, further including the base station.
7. The communication system of embodiment 6, further including the UE, wherein the UE is configured to communicate with the base station.
8. The communication system of embodiment 7, wherein:
   the processing circuitry of the host computer is configured to execute a host application, thereby providing the user data; and
   the UE comprises processing circuitry configured to execute a client application associated with the host application.
11. A method implemented in a base station, comprising one or more of the actions described herein as performed by the network node 110.
15. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs one or more of the actions described herein as performed by the network node 110.
16. The method of embodiment 15, further comprising:
    at the base station, transmitting the user data.
17. The method of embodiment 16, wherein the user data is provided at the host computer by executing a host application, the method further comprising:
    at the UE, executing a client application associated with the host application.
21. A user equipment (UE) configured to communicate with a base station, the UE comprising a radio interface and processing circuitry configured to perform one or more of the actions described herein as performed by the wireless device 130.
25. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's processing circuitry configured to perform one or more of the actions described herein as performed by the wireless device 130.
26. The communication system of embodiment 25, further including the UE.
27. The communication system of embodiment 26, wherein the cellular network further includes a base station configured to communicate with the UE.
28. The communication system of embodiment 26 or 27, wherein:
    the processing circuitry of the host computer is configured to execute a host application, thereby providing the user data; and
    the UE's processing circuitry is configured to execute a client application associated with the host application.

31. A method implemented in a user equipment (UE), comprising one or more of the actions described herein as performed by the wireless device 130.

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs one or more of the actions described herein as performed by the wireless device 130.

36. The method of embodiment 35, further comprising:
at the UE, receiving the user data from the base station.

41. A user equipment (UE) configured to communicate with a base station, the UE comprising a radio interface and processing circuitry configured to perform one or more of the actions described herein as performed by the wireless device 130.

45. A communication system including a host computer comprising:
a communication interface configured to receive user data originating from a transmission from a user equipment (UE) to a base station,
wherein the UE comprises a radio interface and processing circuitry, the UE's processing circuitry configured to: perform one or more of the actions described herein as performed by the wireless device 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by the wireless device 130.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by the wireless device 130.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to perform one or more of the actions described herein as performed by the network node 110.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 110.

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

71. A method implemented in a base station, comprising one or more of the actions described herein as performed by the network node 110.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the wireless device 130.

76. The method of embodiment 75, further comprising:
at the base station, receiving the user data from the UE.

77. The method of embodiment 76, further comprising:
at the base station, initiating a transmission of the received user data to the host computer.

REFERENCES

[1] RP-193252 'New Work Item on NR small data transmissions in INACTIVE state'

The invention claimed is:
1. A method performed by a wireless device, the method being for handling uplink communication to a network node, the wireless device and the network node operating in a wireless communications network, and the method comprising:

obtaining a first configuration of a set of periodic uplink time-frequency resources for uplink communication to the network node, wherein the first configuration is specific for the wireless device, and wherein the first configuration configures the set of periodic uplink time-frequency resources to support at least one of:
- a first procedure comprising a first Physical Uplink Shared Channel (PUSCH) transmission of a Message A (MsgA) transmission;
- a second procedure comprising uplink transmissions of, or corresponding to, a two-step Random Access Channel (RACH) procedure comprising a first Physical Random Access Channel (PRACH) transmission and a second PUSCH transmission; or
- a third procedure comprising uplink transmissions of, or corresponding to, a four-step RACH procedure comprising a second PRACH transmission and a third PUSCH transmission; and wherein a Timing Advance (TA) value of at least one of the first PUSCH transmission, the second PUSCH transmission, the third PUSCH transmission, the first PRACH transmission and the second PRACH transmission is at least one of:
- configurable by the network node or another network node, independently between the PUSCH and the PRACH transmissions;
- configured to be zero, wherein the wireless device is configured to refrain from validating the TA value; or
- explicitly configured and validated before transmission from the inactive or idle state.

2. The method according to claim 1, wherein the set of periodic uplink time-frequency resources for uplink communication are in one or more PUSCH uplink grants.

3. The method according to claim 1, wherein a size of a buffer for the uplink communication of the wireless device is smaller than a threshold.

4. The method according to claim 1, wherein the first configuration further configures the wireless device with at least one of:
- a longer cyclic prefix than a currently used cyclic prefix by the wireless device, wherein the longer prefix is one of: specific for the wireless device, and non-specific for the wireless device,
- a guard time, wherein the guard time is one of: specific for the wireless device, and non-specific for the wireless device, and
- a guard band, wherein the guard band is one of: specific for the wireless device, and non-specific for the wireless device.

5. The method according to claim 1, wherein the first configuration further configures the wireless device to refrain from performing additional link adaptations after having performed a first link adaptation during initial connection with the network node.

6. The method according to claim 1, wherein the TA value is configured to be zero, and wherein the method further comprises refraining from validating the configured TA value equal to zero before data transmission.

7. The method according to claim 1, wherein the TA value is configured to be zero, and wherein the method further comprises determining a validity of the configured TA equal to zero before data transmission.

8. The method according to claim 6, wherein whether the wireless device performs the refraining or the determining is configurable.

9. The method according to claim 1, wherein the method further comprises updating the configured TA based on at least one of: an occurrence of a Hybrid Automatic Retransmission request (HARQ) retransmission; or a movement of the wireless device to a connected mode.

10. The method according to claim 1, wherein the method further comprises obtaining a second configuration, the second configuration configuring the wireless device to adjust the configured TA value, or another configured TA value in the absence of feedback from the network node.

11. A method performed by a network node, the method being for handling uplink communication by a wireless device, the network node and the wireless device operating in a wireless communications network, the method comprising:
providing, to the wireless device, a first configuration of a set of periodic uplink time-frequency resources for uplink communication by the wireless device, wherein the first configuration is specific for the wireless device, and wherein the first configuration configures the set of periodic uplink time-frequency resources to support at least one of:
- a first procedure comprising a first Physical Uplink Shared Channel (PUSCH) transmission of a Message A (MsgA) transmission;
- a second procedure comprising uplink transmissions of, or corresponding to, a two-step Random Access Channel (RACH) procedure comprising a first PRACH transmission and a second PUSCH transmission; or
- a third procedure comprising uplink transmissions of, or corresponding to, a four-step RACH procedure comprising a second PRACH transmission and a third PUSCH transmission; and wherein a Timing Advance (TA) value of at least one of the first PUSCH transmission, the second PUSCH transmission, the third PUSCH transmission, the first PRACH transmission and the second PRACH transmission is at least one of:
- configurable by the network node or another network node, independently between the PUSCH and the PRACH transmissions;
- configured to be zero, wherein the wireless device is configured to refrain from validating the TA value; or
- explicitly configured and validated before transmission from the inactive or idle state.

12. The method according to claim 11, wherein the set of periodic uplink time-frequency resources for uplink communication are in one or more PUSCH uplink grants.

13. The method according to claim 11, wherein a size of a buffer for the uplink communication of the wireless device is smaller than a threshold.

14. The method according to claim 11, wherein the first configuration further configures the wireless device with at least one of:
- a longer cyclic prefix than a currently used cyclic prefix by the wireless device, wherein the longer prefix is one of: specific for the wireless device, and non-specific for the wireless device;
- a guard time, wherein the guard time is specific for the wireless device or non-specific for the wireless device; or
- a guard band, wherein the guard band is specific for the wireless device or non-specific for the wireless device.

15. The method according to claim 11, wherein the first configuration further configures the wireless device to refrain from performing additional link adaptations after having performed a first link adaptation during initial connection with the network node.

16. The method according to claim 11, wherein the TA value is configured to be zero, and wherein the first configuration further configures the wireless device to refrain from validating the configured TA value equal to zero before data transmission.

17. The method according to claim 11, wherein the TA value is configured to be zero, and wherein the first configuration further configures the wireless device to determine a validity of the configured TA equal to zero before data transmission.

18. The method according to claim 16, wherein whether the wireless device performs the refraining from validating the configured TA value equal to zero before data transmission or the determining of the validity of the configured TA equal to zero before data transmission is configurable.

19. The method according to claim 11, wherein the first configuration further configures the wireless device to update the configured TA based on at least one of:
    an occurrence of a Hybrid Automatic Retransmission request (HARQ) retransmission; or
    a movement of the wireless device to a connected mode.

20. The method according to claim 11, wherein the method further comprises providing a second configuration to the wireless device, the second configuration configuring the wireless device to adjust the configured TA value, or another configured TA value in the absence of feedback from the network node.

21. A wireless device, for handling uplink communication to a network node, the wireless device and the network node being configured to operate in a wireless communications network, the wireless device comprising:
    radio circuitry; and
    processing circuitry configured to:
        obtain a first configuration of a set of periodic uplink time-frequency resources for uplink communication to the network node via the radio circuitry, wherein the first configuration is configured to be specific for the wireless device, and wherein the first configuration is configured to configure the set of periodic uplink time-frequency resources to support at least one of:
            a first procedure comprising a first Physical Uplink Shared Channel (PUSCH) transmission of a Message A (MsgA) transmission;
            a second procedure comprising uplink transmissions of, or corresponding to, a two-step Random Access Channel (RACH) procedure comprising a first Physical Random Access Channel (PRACH) transmission and a second PUSCH transmission; or
            a third procedure comprising uplink transmissions of, or corresponding to, a four-step RACH procedure comprising a second PRACH transmission, and a third PUSCH transmission; and
        wherein a Timing Advance (TA) value of at least one of the first PUSCH transmission, the second PUSCH transmission, the third PUSCH transmission, the first PRACH transmission and the second PRACH transmission is at least one of:
            configured to be configurable by the network node or another network node, independently between the PUSCH and the PRACH transmissions;
            configured to be zero, wherein the wireless device is configured to refrain from validating the TA value; or
            explicitly configured and validated before transmission from the inactive or idle state.

22. The wireless device according to claim 21, wherein the set of periodic uplink time-frequency resources for uplink communication are configured to be in one or more PUSCH uplink grants.

23. The wireless device according to claim 21, wherein a size of a buffer for the uplink communication of the wireless device is configured to be smaller than a threshold.

24. A network node, for handling uplink communication by a wireless device, the network node and the wireless device being configured to operate in a wireless communications network, the network node comprising:
    radio circuitry; and
    processing circuitry configured to:
        provide, to the wireless device, a first configuration of a set of periodic uplink time-frequency resources for uplink communication by the wireless device, wherein the first configuration is configured to be specific for the wireless device, and wherein the first configuration is configured to configure the set of periodic uplink time-frequency resources to support at least one of:
            a first procedure comprising a first Physical Uplink Shared Channel (PUSCH) transmission of a Message A (MsgA) transmission;
            a second procedure comprising uplink transmissions of, or corresponding to, a two-step Random Access Channel (RACH) procedure comprising a first Physical Random Access Channel (PRACH) transmission and a second PUSCH transmission; or
            a third procedure comprising uplink transmissions of, or corresponding to, a four-step RACH procedure comprising a second PRACH transmission and a third PUSCH transmission; and
        wherein a Timing Advance, TA, value of at least one of the first PUSCH transmission, the second PUSCH transmission, the third PUSCH transmission, the first PRACH transmission and the second PRACH transmission is configured to be at least one of:
            configured to be configurable by the network node or another network node, independently between the PUSCH and the PRACH transmissions;
            configured to be zero, wherein the wireless device is configured to refrain from validating the TA value; or
            explicitly configured and validated before transmission from the inactive or idle state.

25. The network node according to claim 24, wherein the set of periodic uplink time-frequency resources for uplink communication are configured to be in one or more PUSCH uplink grants.

26. The network node according to claim 24, wherein a size of a buffer for the uplink communication of the wireless device is configured to be smaller than a threshold.

* * * * *